(12) United States Patent
Moore et al.

(10) Patent No.: US 11,946,790 B2
(45) Date of Patent: Apr. 2, 2024

(54) SENSOR ARRANGEMENTS, SENSOR SYSTEMS, AND METHODS FOR DETERMINING HEIGHT OF LIQUIDS IN TANKS

(71) Applicant: Mopeka Products LLC, Colorado City, TX (US)

(72) Inventors: Joel Reese Moore, Colorado City, TX (US); Jonathan Louis Kaufmann, Shavano Park, TX (US); Jason Duane Peck, Leander, TX (US)

(73) Assignee: Mopeka Products LLC, New Braunfels, TX (US)

( * ) Notice: Subject to any disclaimer, the term of this patent is extended or adjusted under 35 U.S.C. 154(b) by 794 days.

(21) Appl. No.: 16/801,135

(22) Filed: Feb. 25, 2020

(65) Prior Publication Data

US 2020/0355540 A1 Nov. 12, 2020

Related U.S. Application Data

(63) Continuation-in-part of application No. 15/249,600, filed on Aug. 29, 2016, now Pat. No. 10,571,328.
(Continued)

(51) Int. Cl.
*G01F 23/296* (2022.01)
*G01F 23/68* (2006.01)

(52) U.S. Cl.
CPC ........ *G01F 23/2968* (2013.01); *G01F 23/686* (2013.01)

(58) Field of Classification Search
None
See application file for complete search history.

(56) References Cited

U.S. PATENT DOCUMENTS

| 3,100,885 A | 8/1963 | Welkowitz et al. |
| 3,603,149 A | 9/1971 | Mekown |

(Continued)

FOREIGN PATENT DOCUMENTS

| DE | 3703658 A1 | 2/1987 |
| DE | 102004028547 A1 | 6/2004 |

(Continued)

OTHER PUBLICATIONS

"Propane Tank Gauge Level Gas Grill Ultrasound By Gaslock Classic," Terapeak, terapeak.com, access: Jun. 2016 downloaded on http://www.terapeak.com/worth/propanetankgaugelevelgasgrillultrasoundbygaslockclassic/252303994808/.

(Continued)

*Primary Examiner* — Daniel S Larkin
(74) *Attorney, Agent, or Firm* — Mackey Law Firm PLLC

(57) ABSTRACT

A sensor arrangement for measuring liquid height in a tank can include a housing, a transducer, and a couplant. The housing can have an interior and an aperture, the aperture placing the interior of the housing in communication with the environment external to the housing. The transducer can be seated within the aperture. The couplant can be mechanically connected to the transducer and can have a compressible couplant body. The couplant body can extend between the transducer and the external environment for transmitting an acoustic pulse from the transducer to a tank bottom for measuring height of a liquid overlaying the transducer.

16 Claims, 23 Drawing Sheets

Related U.S. Application Data

(60) Provisional application No. 62/211,713, filed on Aug. 29, 2015.

(56) References Cited

U.S. PATENT DOCUMENTS

| | | | |
|---|---|---|---|
| 4,901,245 A | | 2/1990 | Olson et al. |
| 5,586,085 A | | 12/1996 | Lichte |
| 5,778,726 A | | 7/1998 | Muller et al. |
| 5,793,705 A | | 8/1998 | Gazis et al. |
| 5,836,192 A | * | 11/1998 | Getman ............ G01F 23/2965 |
| | | | 367/908 |
| 5,962,952 A | | 10/1999 | Gluszyk et al. |
| 6,246,154 B1 | | 6/2001 | Gluszyk et al. |
| 6,397,656 B1 | * | 6/2002 | Yamaguchi ........ G01F 23/2968 |
| | | | 73/290 V |
| 7,114,390 B2 | | 10/2006 | Lizon et al. |
| 7,174,769 B2 | | 2/2007 | Mcsheffrey, Jr. et al. |
| 7,174,783 B2 | | 2/2007 | Mcsheffrey, Jr. et al. |
| 7,287,425 B2 | | 10/2007 | Lagergen |
| 7,298,278 B2 | | 11/2007 | Miller et al. |
| 7,694,560 B1 | * | 4/2010 | Dam ................. G01F 23/2962 |
| | | | 73/290 V |
| 7,905,143 B2 | | 3/2011 | Lagergren |
| 7,926,344 B1 | * | 4/2011 | Hyde ................ G01F 23/2968 |
| | | | 73/296 |
| 8,104,341 B2 | | 1/2012 | Lagergren et al. |
| 8,412,473 B2 | | 4/2013 | Woltring et al. |
| 8,630,814 B2 | | 1/2014 | Cheng et al. |
| 8,689,624 B2 | | 4/2014 | Agam et al. |
| 9,798,367 B2 | | 10/2017 | Huang et al. |
| 9,897,471 B2 | | 2/2018 | Wiest et al. |
| 10,101,193 B2 | | 10/2018 | Pfeiffer et al. |
| 10,571,328 B2 | | 2/2020 | Moore et al. |
| 2004/0035873 A1 | | 2/2004 | Wheeler |
| 2011/0029262 A1 | | 2/2011 | Barkhouse |
| 2013/0263657 A1 | | 10/2013 | Sides |
| 2013/0293388 A1 | | 11/2013 | Ingalsbe et al. |
| 2013/0327140 A1 | * | 12/2013 | Lienenkamp ....... G01F 23/0007 |
| | | | 73/290 V |
| 2016/0163175 A1 | | 6/2016 | Jenkins |

FOREIGN PATENT DOCUMENTS

| | | |
|---|---|---|
| DE | 102014210077 A1 | 12/2015 |
| WO | 2011051949 A1 | 5/2011 |

OTHER PUBLICATIONS

Orzechowski, Stephan W., "Development of an Effective Fuel Level Sensing Technology for Propane Powered Vehicles," (2000). downloaded at http://www.nlbnc.ca/obj/s4/f2/dsk1/tape8/PQDD_0005/MQ45619.pdf Publisher: National Library of Canada, pp. 155.

"Custom Noninvasive Ultrasonic Liquid Level Sensor," Strain Measurement Devices, smdsensors.com, accessed: Jun. 2016. downloaded at http://www.smdsensors.com/Products/CustomerFiles/Products/SMD_Custom_Non_invasive_Ultrasonic_Liquid_Level_Sensors_R2.pdf pp. 1.

Li, Peng, et al., "An accurate detection for dynamic liquid level based on mimo ultrasonic transducer array," IEEE Transactions on Instrumentation and Measurement 64 3 (2015): 582595 downloaded at http://ieeexplore.ieee.org/iel/19/4407674/06912012.pdf?arnumber=6912012 pp. 14.

Thruwall—Non-invasive technology, Hycontrol Level Measurement Solutions, hycontrol.com, accessed Jun. 28, 2016, http://hycontrol.com/leevlmeasurement/viewproduct.php?id=14.

Jun. 12, 2018 Letter from Eric M. Leppo to Michael C. Mackey.

* cited by examiner

SENSOR ARRANGEMENTS, SENSOR SYSTEMS, AND METHODS FOR DETERMINING HEIGHT OF LIQUIDS IN TANKS

CROSS REFERENCE TO RELATED APPLICATIONS

This application is a continuation in part of U.S. patent application Ser. No. 15/249,600 filed Aug. 29, 2016, now U.S. Pat. No. 10,571,328, which claims the benefit of U.S. Provisional Application No. 62/211,713, filed Aug. 29, 2015, the entire contents of which are incorporated herein by reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure generally relates to determining the amount of liquid within a tank, and more particularly to sensor arrangements and systems for determining the height of liquid within tanks such as tanks containing liquefied propane gas.

Description of the Related Art

For as long as small portable propane tanks have been around, inventors have been trying to find low cost and reliable methods to accurately measure the propane level in the tank. There have been many attempts to provide a solution to this problem, but all have various short-comings whether it is inaccuracy, reliability, or cost. Various techniques have been developed which fall into one of the following categories:

One way to determine the amount of liquid in a tank is to correlate the temperature difference between the liquid and the gas in an attempt to determine the propane level. However, these techniques may not provide very good accuracy or resolution and may require that the connected appliance be in use in order to function.

There are devices that utilize pressure in the tank that attempt to tell a user when the tank is getting low. As an example, some two-stage regulators used on recreational vehicles (RV) use this type of device, which typically includes a color coded diaphragm indicator that indicates when a tank is running low based on the sensed pressure in the tank. The problem is that these types of pressure devices can be difficult for the normal consumer to use because pressure in the tank can vary greatly depending on the temperature of the tank, and further, pressure changes occur as gas flows from the tank during use. So, predicting an exact pressure at which one could say a tank is running low can be difficult, and it can be even more difficult to determine the exact propane level based on these pressure-sensing devices.

There are devices that use the tank weight as the indicator of gas level, but as anyone in the tank exchange business could attest to, there are millions of tanks in circulation, with some being over 50 years old. Thus, tare weights of tanks vary greatly, making this type of device inaccurate. Further, some weight measuring devices that fit under the tank are not usable because there are space constraints in the appliance or RV that make it impossible to fit. Some weight measuring devices are also built into grills and use spring-loaded mechanisms to hang the tank, but obviously these are only usable on that grill, and after some time in the weather many don't work well due to corrosion.

There are more expensive tanks that have been developed with built in visual gauges that operate off a float located within the tank. These tanks can work well to measure the propane level; however, they can be relatively costly. They can also be confounded by the practice of swapping tank via tank exchange services instead of refilling and retaining an instrumented tank. Purchasing such a tank becomes useless because the customer cannot use these exchange services, and normal refilling services are becoming harder and harder to find, and almost never open on the weekends or outside normal business hours.

There are devices in the consumer market that use ultrasonic pulse to detect propane level, but they are single point application devices that must be held to the side of the tank and give a simple red or green light indicating whether liquid propane was detected at the location they are held. Therefore, they must be used at multiple locations each time to determine an actual level. A key factor in making ultrasonic technology functional can be the 'coupling' of the ultrasonic device to the wall of the tank so that accurate signals are transmitted and received correctly. Due to the human interaction required to push these devices onto the wall of the tank, the 'coupling' can vary greatly and these types of devices therefore may not able to repeat their indications well. For example, the first use might give a red light, and repeated right away give a green light. Thus, it can end up being an exercise to find the fluid line, taking numerous measurements rapidly up and down the tank, until finally feeling confident in where the fluid line may be located.

Similarly, there are ultrasonic devices used on large propane tanks, 200 gallons and up, that use an ultrasonic sensor to determine tank level. However, these systems require very strong ultrasonic transducers, thus requiring a likewise large battery. They are connected via wire harness to a transmitter box that must be mounted on the top side of the tank unobstructed. The transmitter box then communicates only with the manufacturer's satellite system that in turn communicates via the internet to a customer. Given the size of the system, complexity, and cost of over $1000, it is not a viable alternative for the portable propane tanks.

While each of these devices may have certain limited applications, there remains a need for improved sensor arrangements, sensor systems, and methods for determining height of liquid in tanks. The present disclosure provides a solution to this need.

BRIEF SUMMARY OF THE INVENTION

A sensor arrangement for measuring liquid height in a tank comprises a housing, a transducer, and a couplant. The housing has an interior and an aperture, the aperture placing the interior of the housing in communication with the environment external to the housing. The transducer can be seated within the aperture. The couplant can be mechanically connected to the transducer and has a compressible couplant body. The couplant body extends between the transducer and the external environment to transmit and acoustic pulse from the transducer to a tank bottom for measuring height of a liquid overlaying the transducer.

In certain embodiments, the couplant body can extend from the transducer to a location in the external environment beyond an external surface of the housing. The couplant body can include a viscoelastic urethane polymer or silicon rubber material. The couplant body can include a tackifier of sufficient strength to adhere the couplant to the transducer. The couplant can have a surface opposite the transducer of tackiness sufficient to adhere the couplant to a tank bottom. The couplant body can include a material with a hardness between about 20 Shore and about 40 Shore.

In accordance with certain embodiments, the housing can define a magnet seat. The magnet seat can be offset from the aperture. A magnet can be captive within the magnet seat. The magnet can have an attractive force that exceeds a compressive strength of the couplant body. The magnet can be press fit or bonded into the magnet seat. An external surface of the magnet can be flush with an external surface of the housing. The magnet can be a first magnet and a second magnet can be press fit into or bonded to the housing on a side of the aperture opposite the first magnet.

It is also contemplated that, in accordance with certain embodiments, the housing aperture can have a transducer lip. The transducer lip can have a plurality of segments arranged circumferentially about the housing aperture. The housing aperture can have a couplant lip. The couplant lip can be arranged axially outward of the transducer lip. The couplant lip can be arranged radially outward of the transducer lip. It is contemplated that the couplant lip can have a width that is greater than a width of the couplant in an uncompressed state, the couplant lip thereby providing an expansion volume for the couplant upon compressive seating of the couplant to a tank bottom.

In certain embodiments, the couplant can be fixed to the housing about the couplant lip. The couplant can be sealably fixed about the couplant lip, thereby isolating the housing interior from the external environment. The couplant can have a relaxed profile and a compressed profile, the compressed profile being concave and extending toward (and/or into) the housing aperture. The relaxed profile can be block-shaped, being substantially rectangular in contemplated embodiments.

In accordance with certain embodiments, the transducer can include a piezo body. The transducer can be seated about the transducer lip of housing aperture. An radially outer peripheral portion of the transducer can be fixed to the transducer lip. A radially inner portion of the transducer can be axially free, thereby being arranged to displace according to an electrical current applied to the transducer. The couplant can be fixed to a surface of the couplant opposite the housing interior. It is contemplated that the couplant can be adhered to the transducer.

It is also contemplated that, in accordance with certain embodiments, a controller can be disposed within the housing interior. The controller can be operably connected to the transducer. One or more micro-wire can couple the controller to the transducer, the one or more micro-wire extending into the housing aperture. A wireless module can be disposed within the housing interior. The wireless module can be in wireless communication with a remote user interface, such as a display module or mobile device, by a low-power wireless link. The controller can be operably connected to the wireless module. A battery can be electrically connected to the control module and/or the wireless module. The battery can be a low-power battery. The battery can have a low profile and may be a coin cell battery. A coil can be electrically connected to the battery and the transducer for acquiring a voltage potential and applying the potential to the transducer to generate an acoustic pulse. The controller can be operatively connected to the coil, such as by one or more switch devices, for acquiring a voltage potential with the coil and application of the charge to the transducer.

In certain embodiments, the controller can include a processor. The processor can be communicative with the transducer and/or the wireless module through an interface. The controller can include a non-transitory machine-readable memory connected to the controller. The memory can have instructions recorded thereon that, when read by the processor, cause the processor to undertake certain actions.

In accordance with certain embodiments, the instructions can cause the transducer to generate an acoustic pulse. The instructions can cause the traducer to report receipt of an acoustic pulse. The instructions can cause the transducer to report receipt of an acoustic pulse for a predetermined time interval. The instructions can cause the transducer report receipt of an acoustic pulse for a predetermined time interval subsequent to generation of an acoustic pulse. The report can include a waveform of acoustic energy during a predetermined time interval.

It is also contemplated that, in accordance with certain embodiments, the instructions can cause the processor to compress a report received from the transducer. The instructions can cause the processor to record a predetermined number of acoustic peaks received from the transducer during a predetermined time interval. The predetermined number of peaks can be eight peaks. The peaks can be wirelessly pushed as an advertisement packet to one or more remote devices wireless connected to the controller by the wireless module disposed within the housing interior.

In certain embodiments, the sensor arrangement can include a display module. The display module can be remote from the sensor, such as in the environment external to the housing. The display module can be a dedicated device. The display module can be a multipurpose device, such as a handheld mobile device. The display module can be wirelessly connected to the sensor by a wireless link. The wireless link can be a low-power wireless link. The wireless link can be a simplex wireless link, data communication on the link originating from the sensor only. It is contemplated that the sensor be unable wireless receive data from the display module via the wireless link.

In accordance with certain embodiments, the display module can include a processor. The display module can include a wireless module wirelessly connected to a sensor module by a wireless link. The wireless link can be a simplex wireless link. The wireless link can be a low-power wireless link, such as a Bluetooth link by way of non-limiting example. The display module can include a graphical user interface (GUI) operably. The processor can be operably connected to the GUI. The display module can include a memory. The processor can be connected to the memory. The memory can be a non-transitory machine-readable memory having instructions recorded thereon that, when read by the processor, cause the processor to undertake certain actions.

It is also contemplated that, in accordance with certain embodiments, the instructions can cause the processor to receive from the sensor module data indicative of height of a liquid overlaying a tank bottom to which the sensor module is acoustically coupled. The data can be received via the wireless link. In accordance with certain embodiments, the instructions can cause the processor to receive an advertisement packet from the sensor module. The advertisement packet can have a predetermined number of acoustic intensity pulses. The advertisement packet can have eight (8) acoustic intensity pulses. The predetermined number of acoustic pulses can span a predetermined time interval. The time interval can be, for example, about between about 2 milliseconds and about 4 milliseconds.

In certain embodiments, the instructions can cause the processor to determine a height of liquid overlaying the tank bottom. The height can be determined using a plurality of acoustic intensities related in an advertisement from the sensor module. Determining the height can include one or more calculations using acoustic intensities related in the advertisement. The calculations can include a statistical calculation. An average of the acoustic intensities can be calculated. A standard deviation of the acoustic intensities can be calculated. Determining the height can include comparing the result of a calculation to a lookup table stored on the memory, the lookup table having an association of calculated results to liquid height.

In accordance with certain embodiments, the instructions can cause the processor to provide the determined height to a graphical user interface (GUI) of the display module, the GUI being operably connected to the processor. The height of liquid overlaying the tank bottom can be indicative of height of liquefied propane gas (LPG) in an LPG tank. LPG can be issuing from the tank coincident with determining height of LPG in the tank. The LPG tank can be a mobile tank, for example, an LPG tank carried by a vehicle.

It is also contemplated that, in accordance with certain embodiments, the instructions can cause the processor to receipt a sync indicator from the sensor module. The sync indicator can be received wirelessly from the sensor module. The sync indicator can be provided wirelessly by the sensor module upon receiving a user input. The sync indicator can be provided for a predetermined time interval subsequent to receiving the user input. The sync indicator can accompany an advertisement packet provided wirelessly by the sensor module. Upon receipt of an advertisement packet including the sync indicator, the instructions can thereafter determine height based on advertisement packets received from the sensor module.

A method of determining height of liquid overlaying transducer includes acoustically coupling a transducer to a tank bottom and generating an acoustic pulse with a transducer. The acoustic pulse can be communicated into a liquid overlaying the tank bottom. The acoustic pulse can be reflected pulse from a surface of the liquid overlaying the tank bottom and received with the transducer. A time interval between generation of the acoustic pulse and receipt of the reflected acoustic pulse can be calculated, and a height of the liquid overlaying the tank bottom can be determined based on the calculated time interval.

In certain embodiments, the method can include providing indication of the determined height to a user interface remote from the transducer. The method can include acoustic pulses received by the transducer within a predetermined time period as a waveform. Peaks can be identified in the waveform that appear within the predetermined time period. A predetermined number of peaks can be selected during the predetermined time period, for example the eight (8) peaks with the greatest peak value.

In accordance with certain embodiments, the peaks can be communicated to a display module. Communication between the sensor module and the display module can include solely the identified peaks appearing during the predetermined time interval. A height of liquid can be determined at the display module with using the received peaks.

These and other features of the systems and methods of the subject disclosure will become more readily apparent to those skilled in the art from the following detailed description of the preferred embodiments taken in conjunction with the drawings.

DETAILED DESCRIPTION OF THE INVENTION

Figure 1:
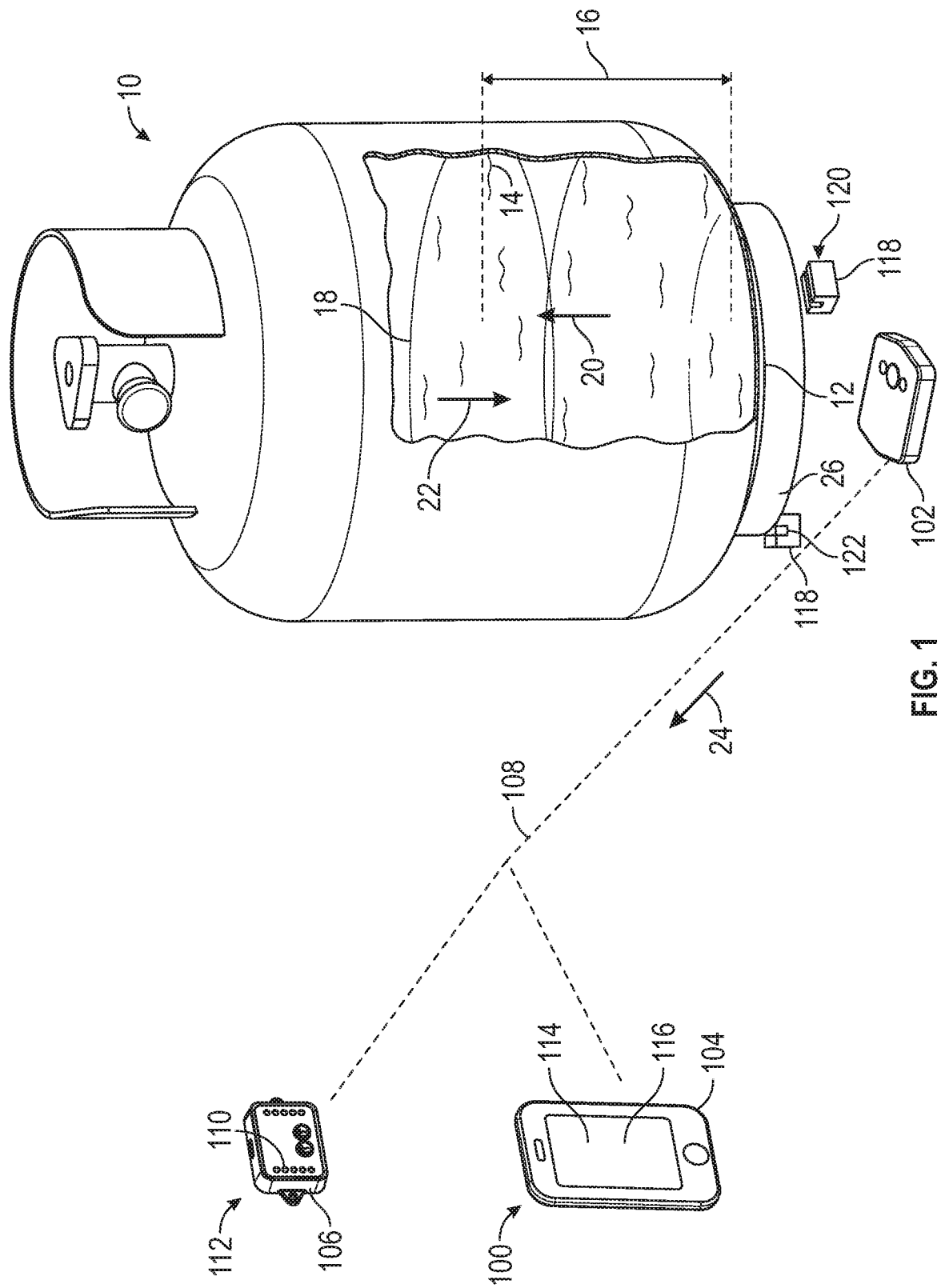
FIG. 1 is an exploded schematic view of a sensor arrangement in accordance with an exemplary embodiment of the present disclosure, showing a sensor module exploded away from a tank bottom and communicative with one or more display modules.

The Figures described above and the written description of specific structures and functions below are not presented to limit the scope of what Applicant has invented or the scope of the appended claims. Rather, the Figures and written description are provided to teach any person skilled in the art to make and use the invention for which patent protection is sought. Those skilled in the art will appreciate that not all features of a commercial embodiment of the invention are described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure.

It must be understood that the invention disclosed and taught herein is susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims. When referring generally to such elements, the number without the letter is used. Further, such designations do not limit the number of elements that can be used for that function. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. As used herein, the term "predetermined" and like terms do not refer to a specific value or other item unless otherwise indicated, but rather refer to something known in accordance with a particular embodiment, application or step that may nonetheless change as between different embodiments, applications or steps in practice.

This disclosure provides devices, systems and methods for measuring the height of a liquid level in a tank, e.g., a portable propane tank. In at least one embodiment, a system according to the disclosure can include a relatively small, thin, battery powered sensor device packaged uniquely for being disposed in the small, thin space under a tank and coupled to the tank using magnets and/or other coupling structure. In at least one embodiment, an ultrasonic sensing device according to the disclosure can include a low-power wireless technology (e.g., Bluetooth) to transmit a measured fluid level out from under a tank to a graphical user interface (GUI) of a display module, which can include a cell phone with an application that displays the liquid level (and/or related information) and/or an independent, standalone, receiver display unit.

Figure 2:
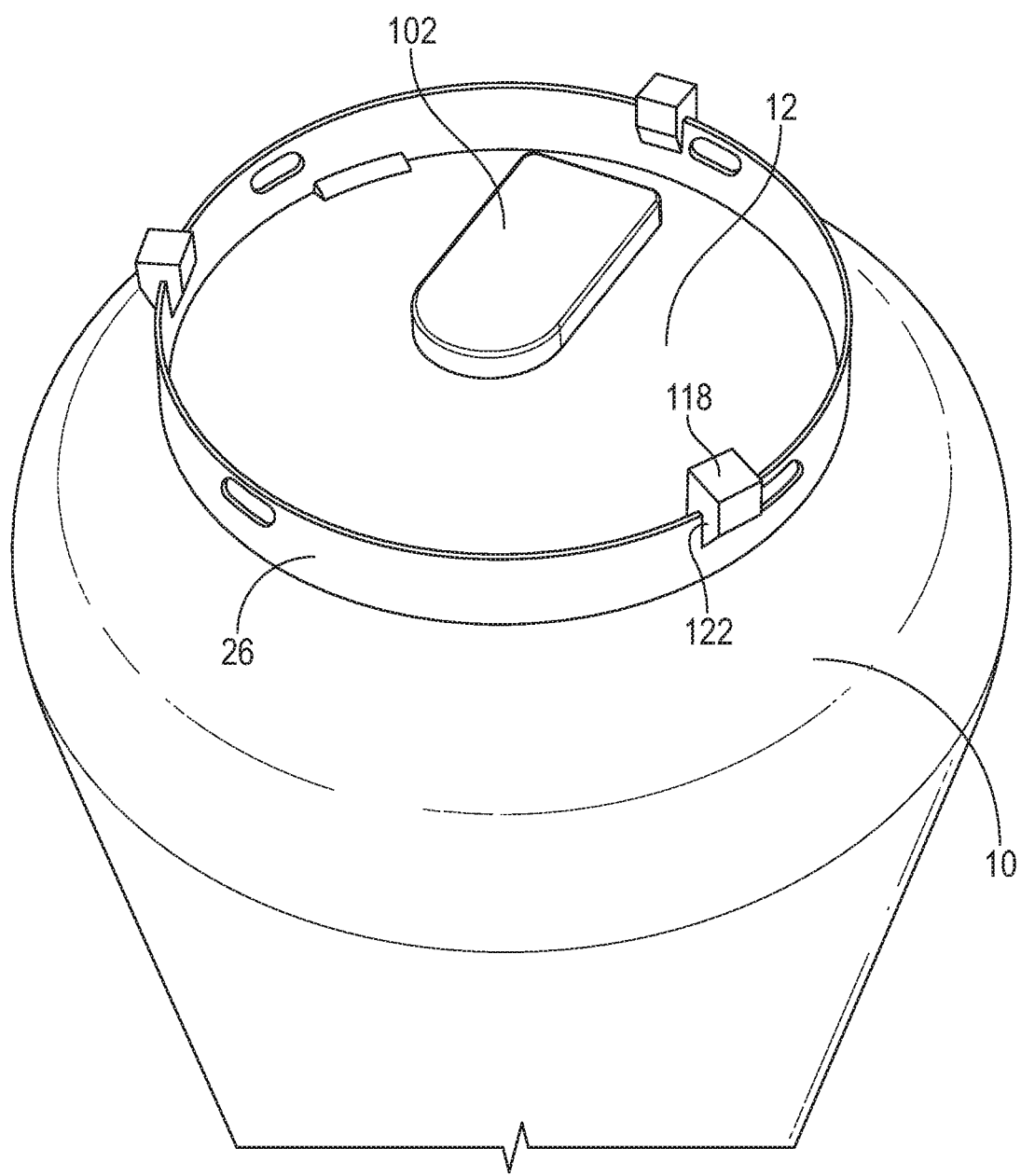
FIG. 2 is a perspective view of the sensor module illustrated in FIG. 1, showing the sensor module mounted to a tank bottom for determined height of liquid overlaying the sensor module.
Figure 3:
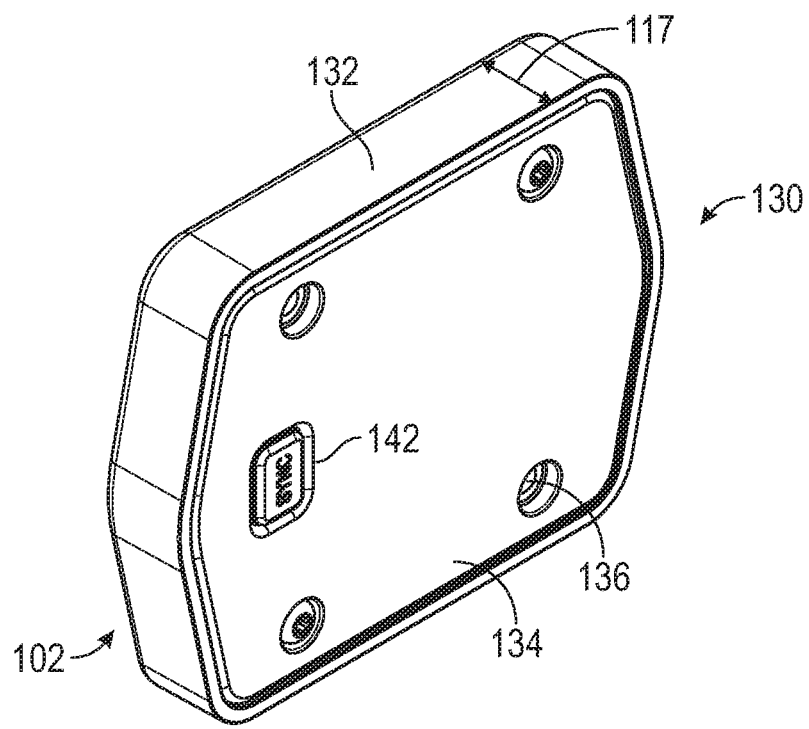
FIG. 3 is a perspective view of the sensor module illustrated in FIG. 1, showing a ground-side body of sensor module housing.
Figure 4:
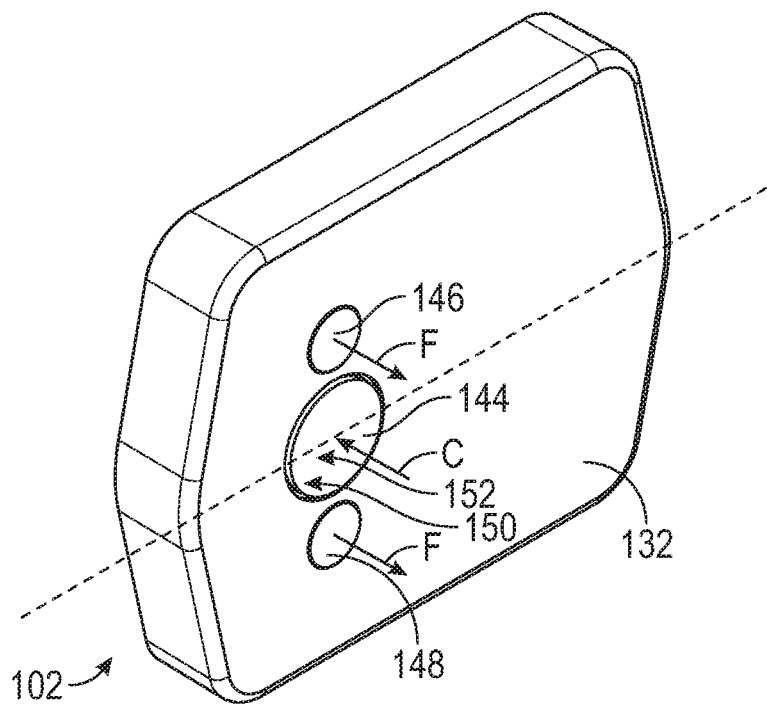
FIG. 4 is a perspective view of the sensor module illustrated in FIG. 1, showing a tank-side body of the sensor module housing.
Figure 5:
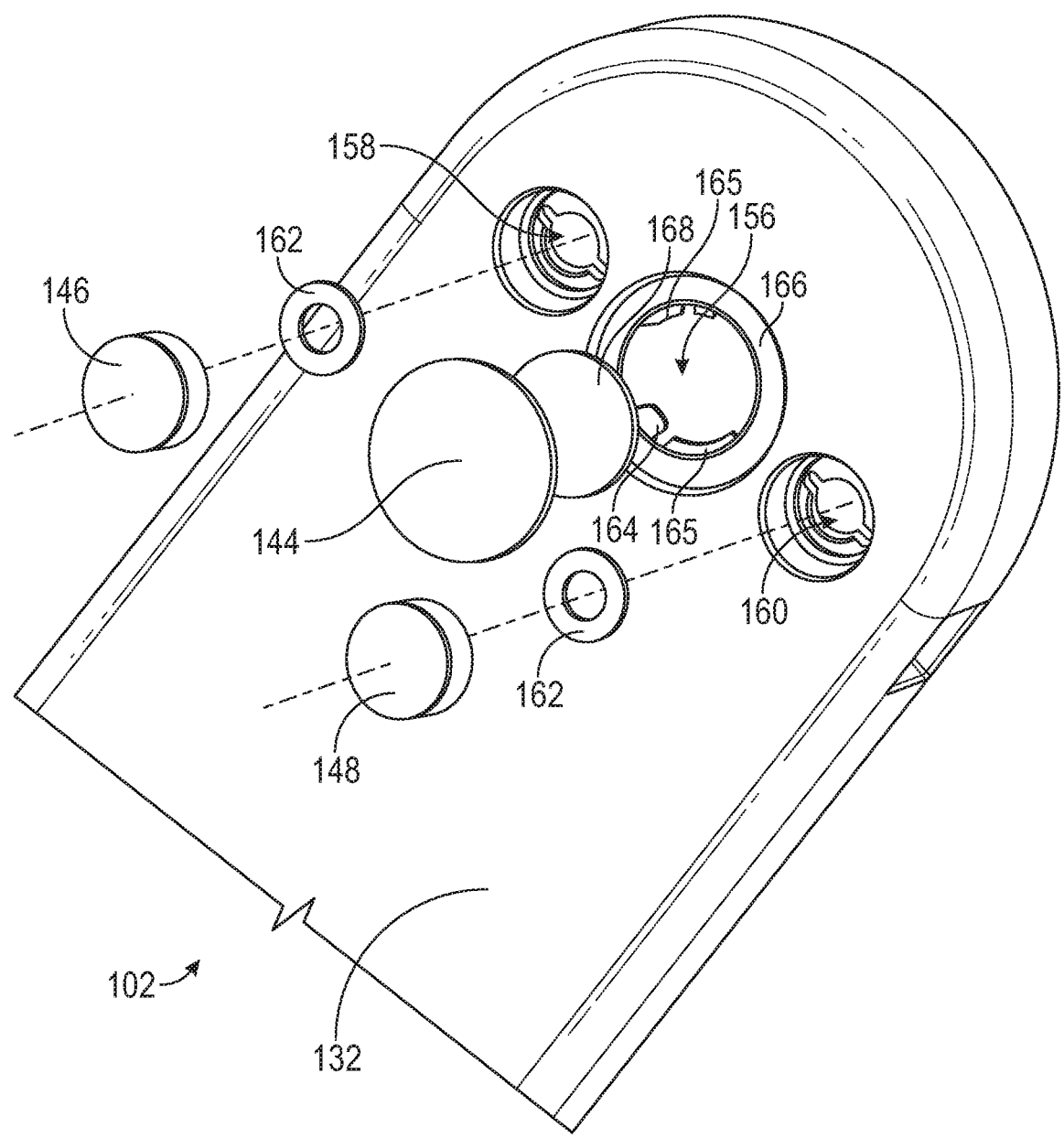
FIG. 5 is an exploded perspective view of the sensor module illustrated in FIG. 1, showing magnet seats and a transducer aperture of the sensor module housing.
Figure 6:
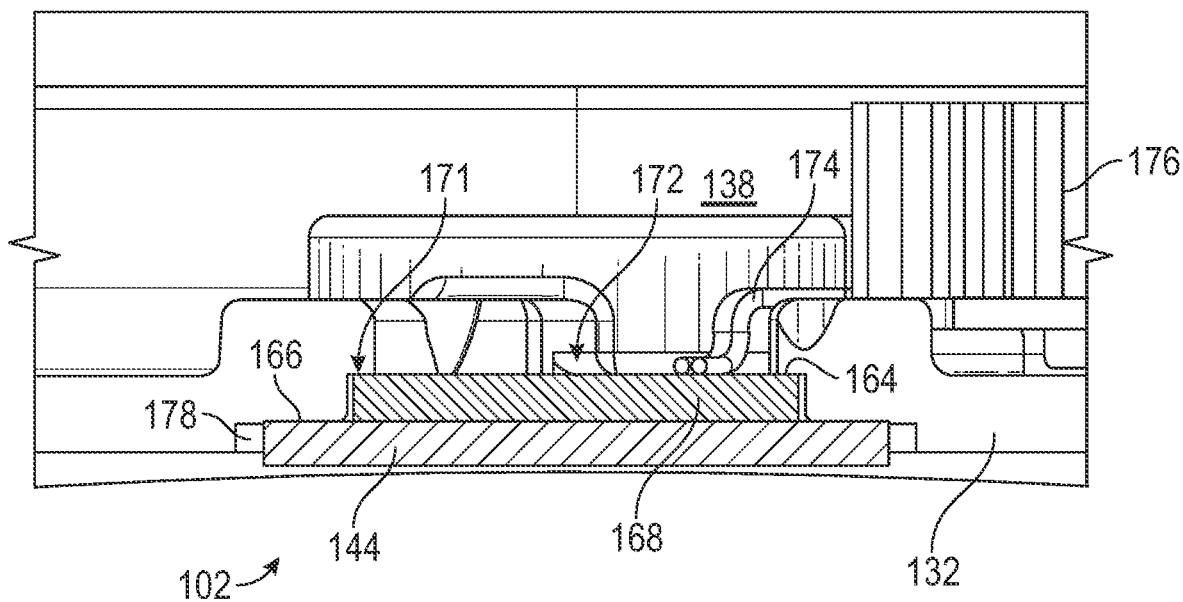
FIG. 6 is a partial cross-sectional view of the sensor module illustrated in FIG. 1, showing a transducer and couplant seated within a housing aperture of the sensor module.
Figure 7:
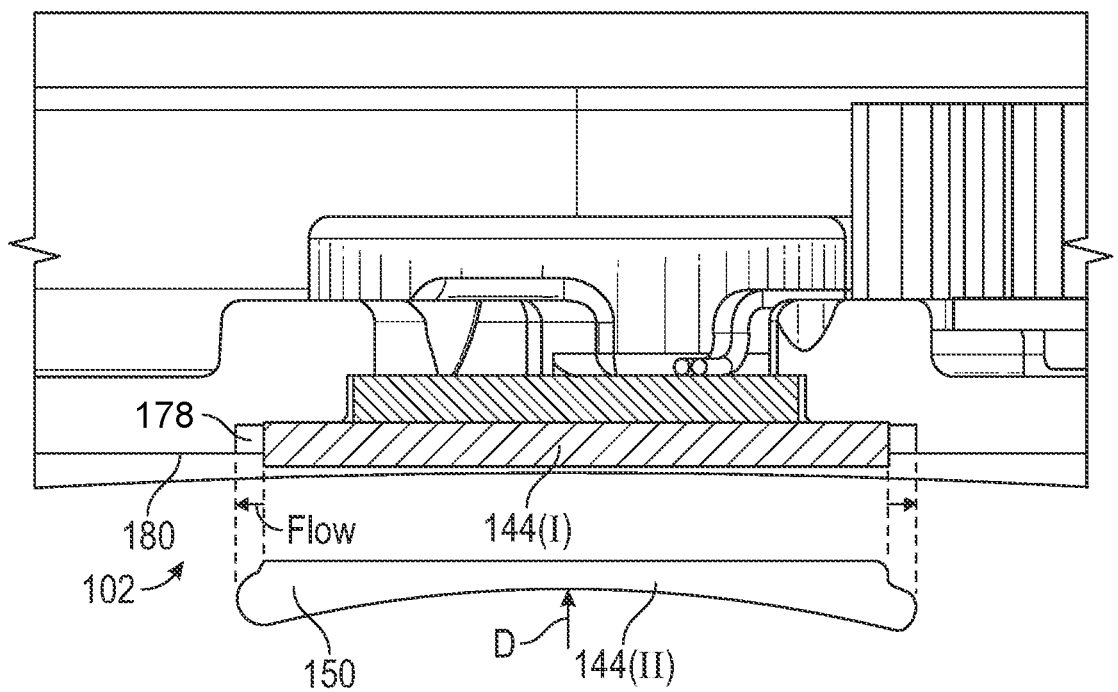
FIG. 7 is a partial cross-sectional view of the sensor module illustrated in FIG. 1, showing the couplant in a relaxed state and a compressed state.
Figure 8:
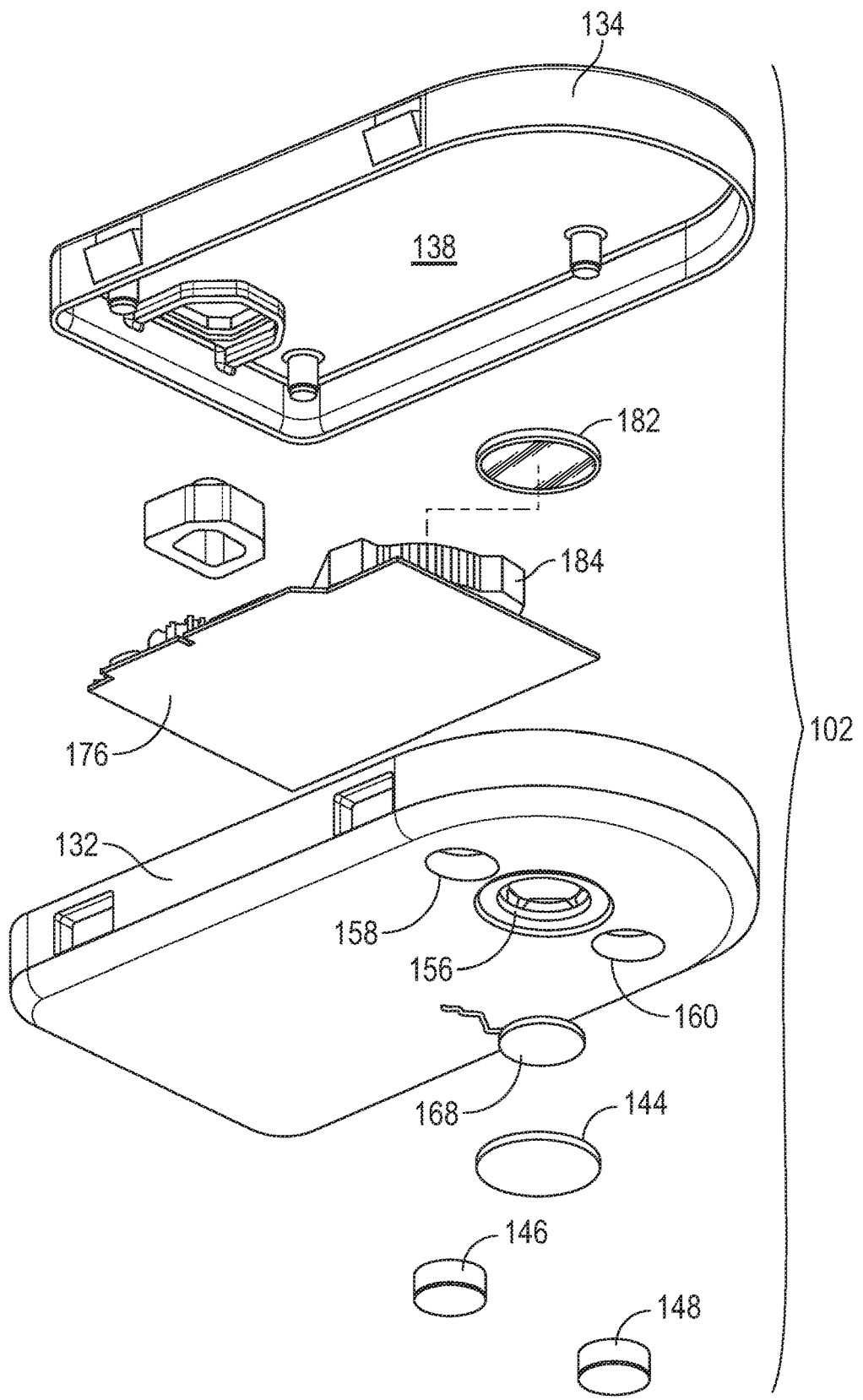
FIG. 8 is an exploded perspective view of the sensor module illustrated in FIG. 1, showing a controller and battery contained within an interior of the sensor module.
Figure 9:
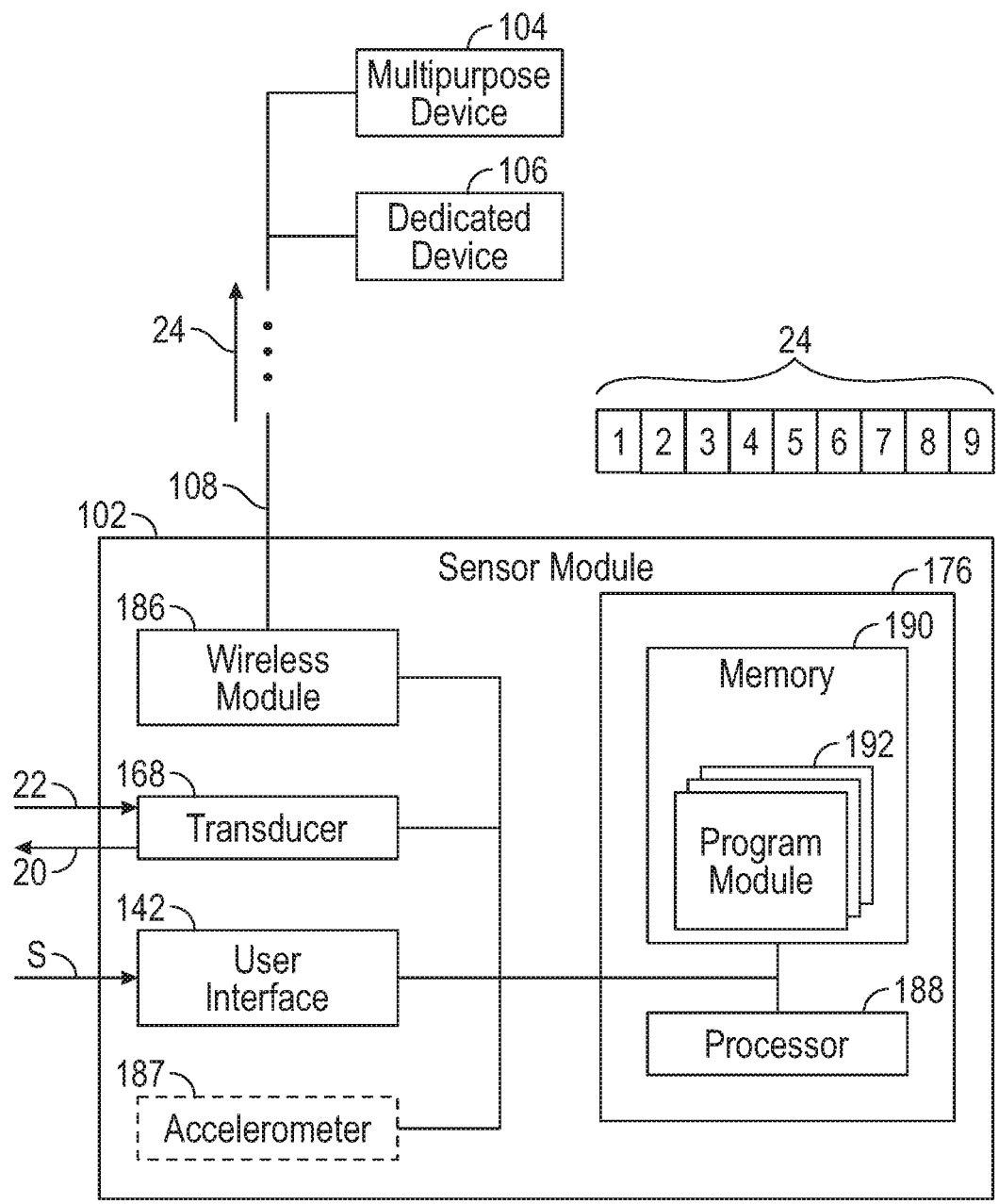
FIG. 9 is a schematic view of the sensor arrangement of FIG. 1, showing a controller and elements connected thereto within the sensor module.
Figure 10:
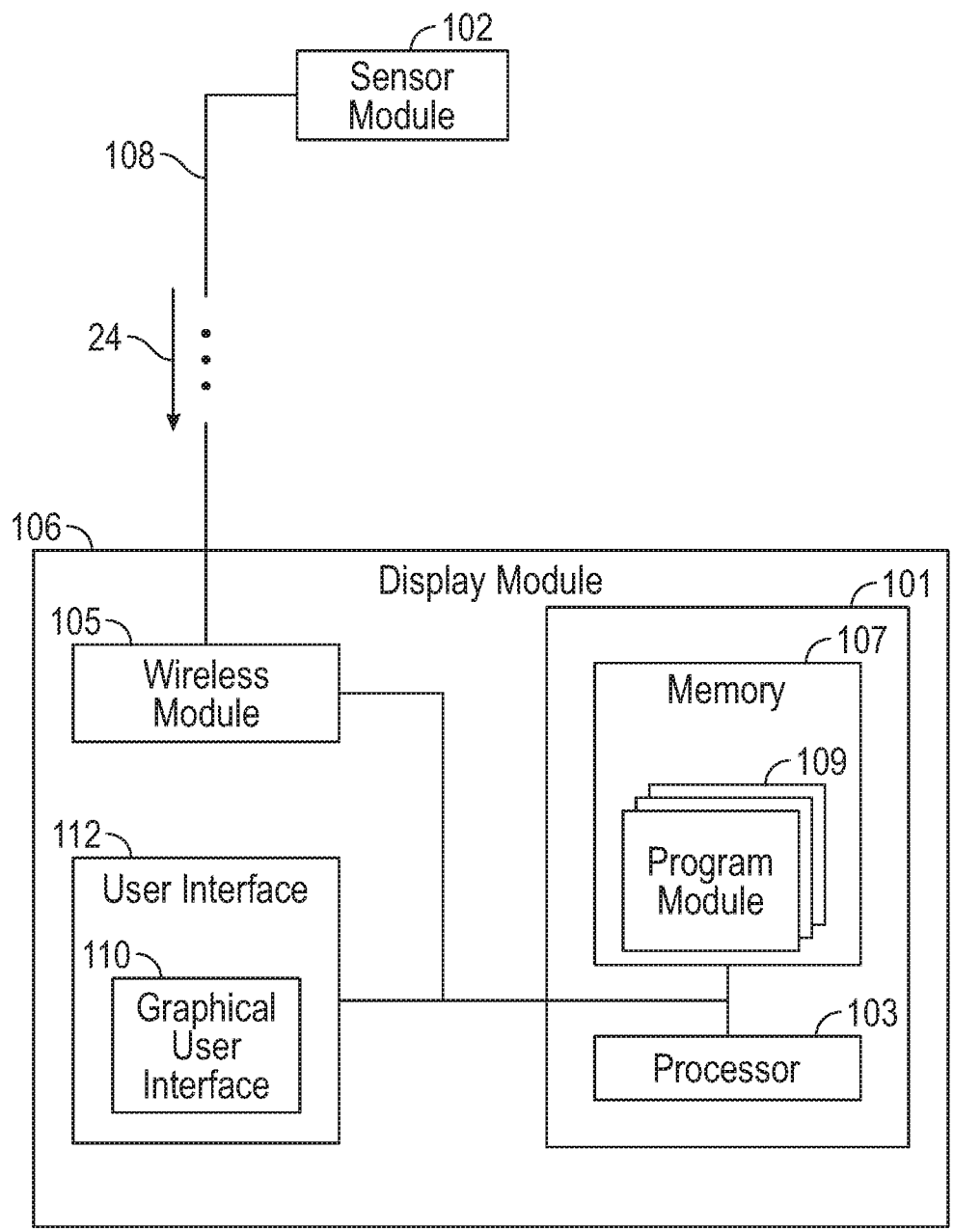
FIG. 10 is a schematic view of the display module of FIG. 1, showing a controller and elements connected thereto within the display module.
Figure 11:
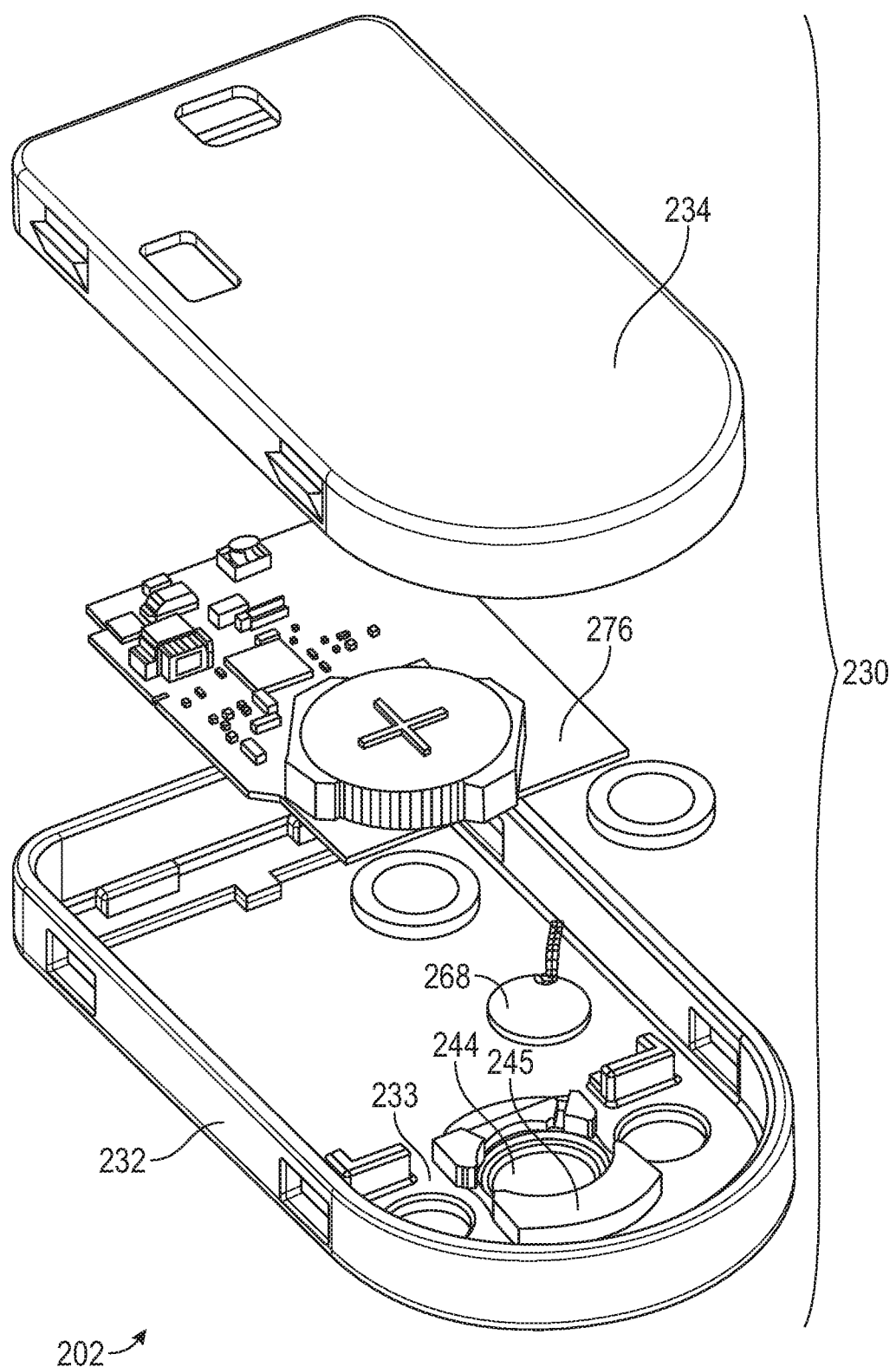
FIG. 11 is an exploded perspective of another embodiment of the sensor module, showing a couplant with a flange defined at a periphery of the couplant.
Figure 12:
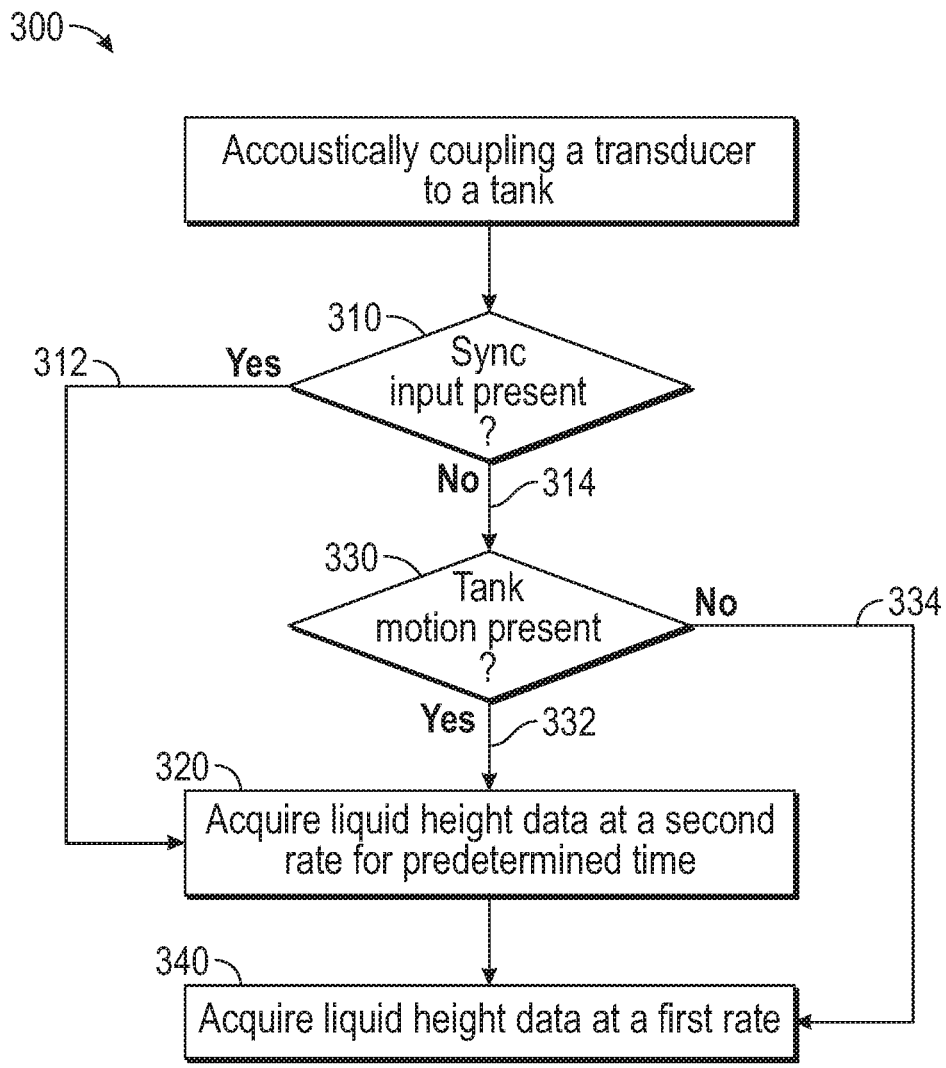
FIG. 12 is a flowchart of a method of acquiring acoustic measurements of liquid height in a tank using an acoustic sensor, showing selection between first and second sampling rates according to whether a synchronization input is present and whether tank motion is present.
Figure 13:
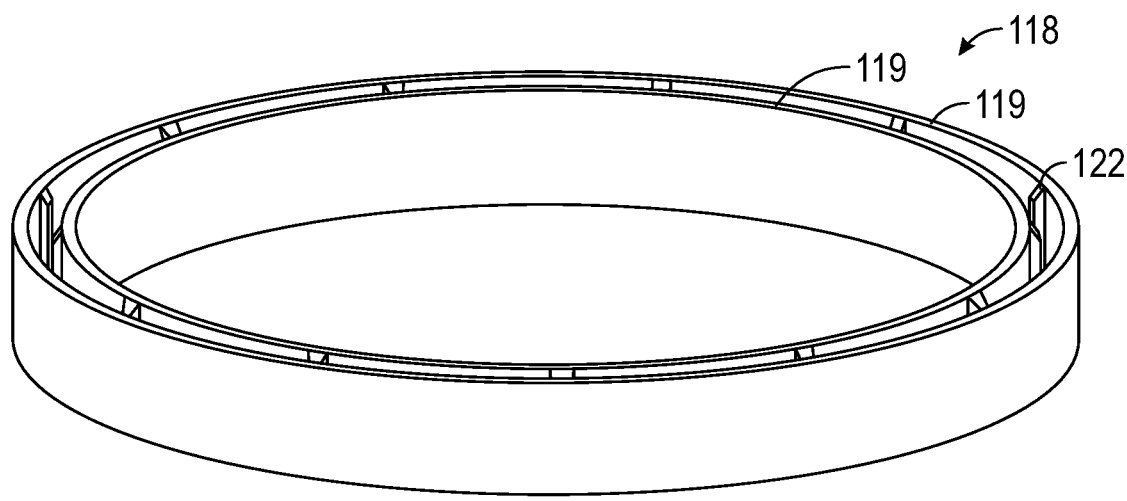
FIG. 13 is a perspective view of one of many embodiments of a foot for a tank according to the disclosure.
Figure 14:
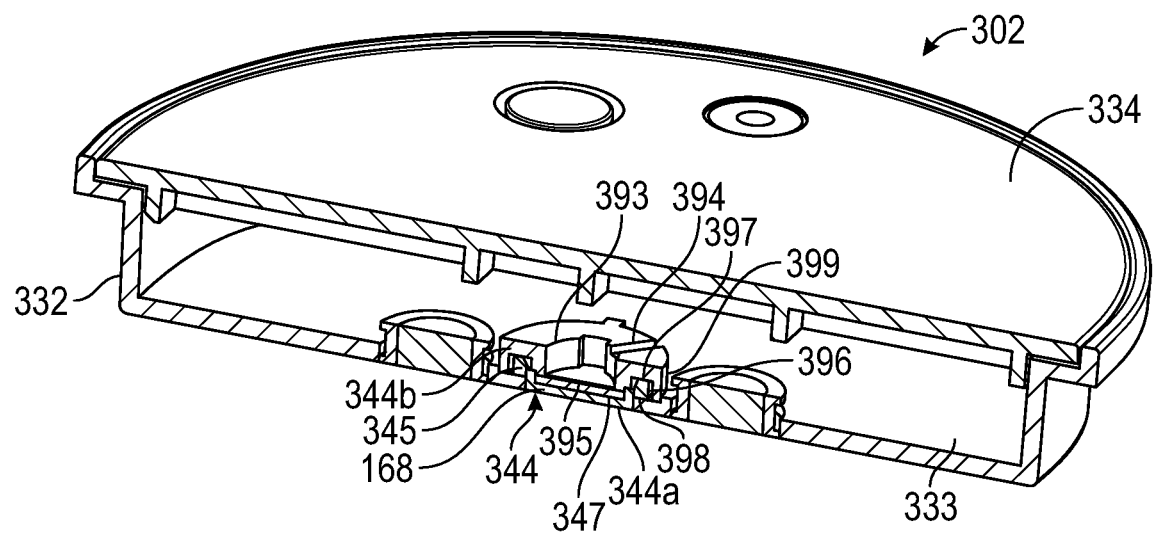
FIG. 14 is a top perspective cross-sectional view of one of many embodiments of a sensor module according to the disclosure.
Figure 15:
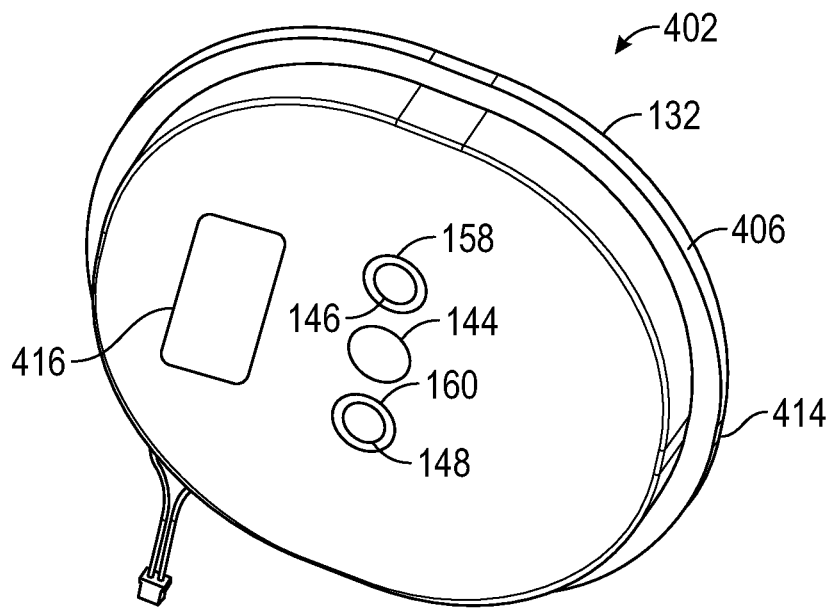
FIG. 15 is a bottom perspective view of another of many embodiments of a sensor module according to the disclosure.
Figure 16:
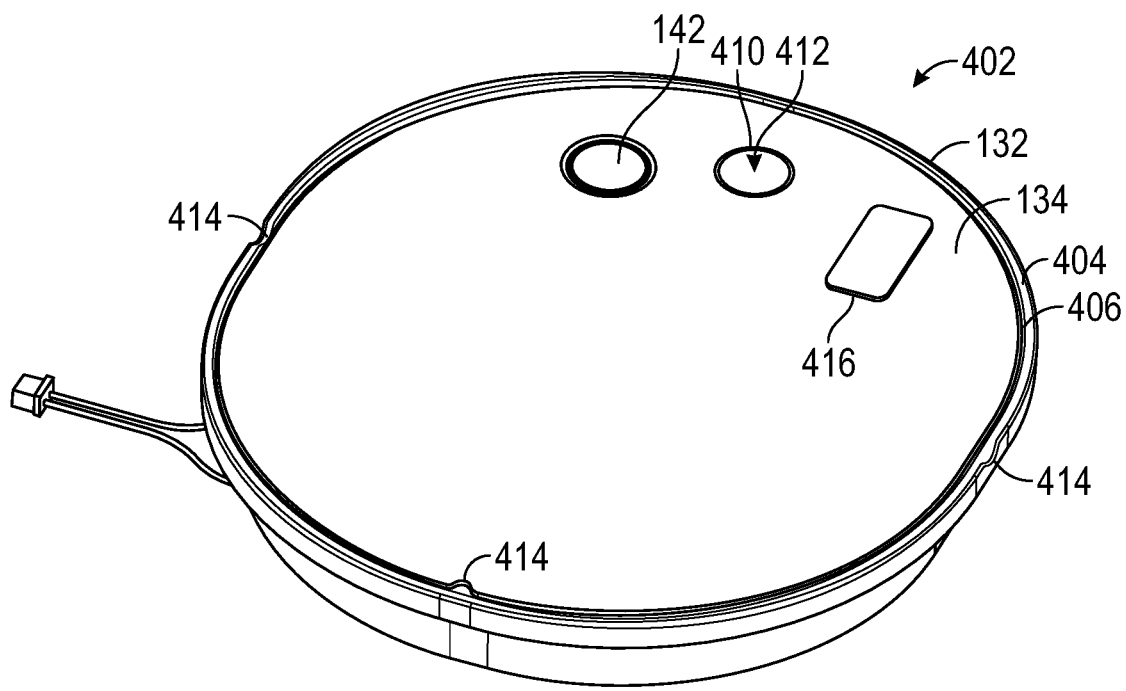
FIG. 16 is a top perspective view of the embodiment of FIG. 15.
Figure 17:
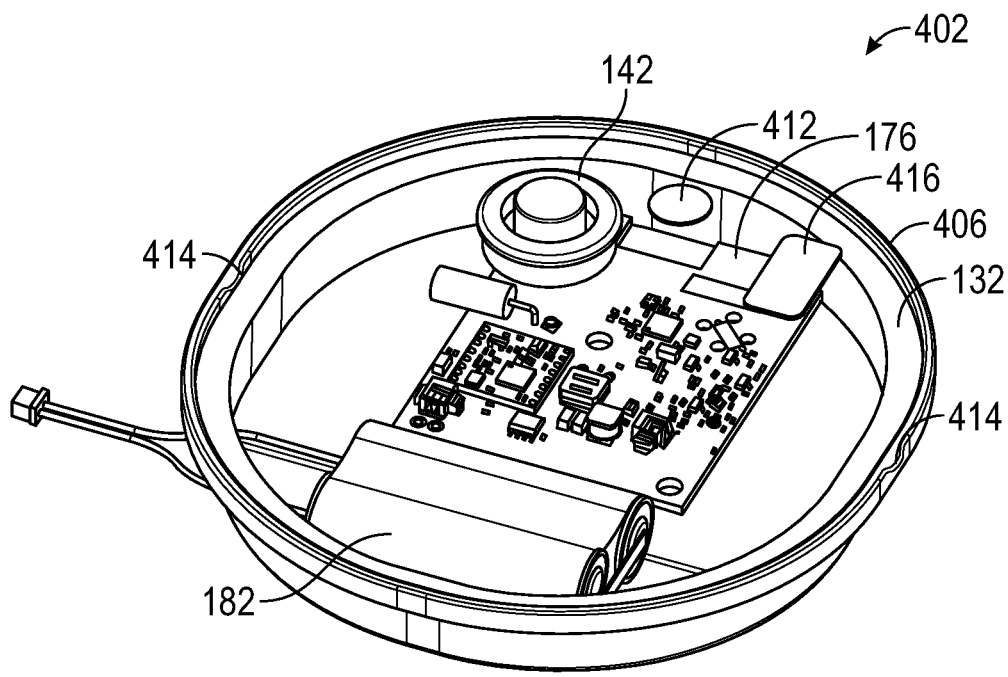
FIG. 17 is a top perspective view of the embodiment of FIGS. 15-16 with a portion made transparent.
Figure 18:
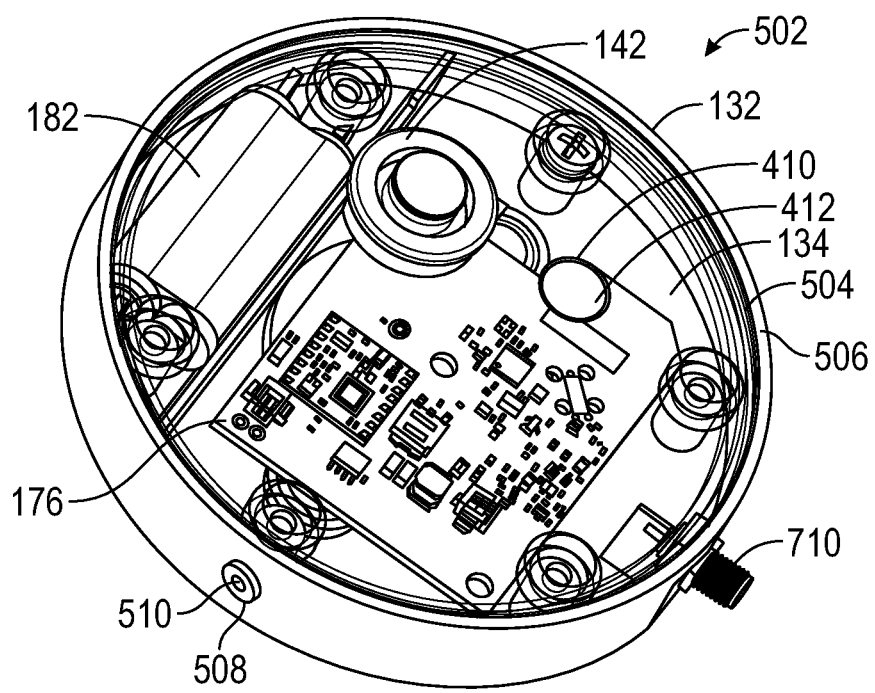
FIG. 18 is a top perspective view of yet another of many embodiments of a sensor module according to the disclosure.
Figure 19:
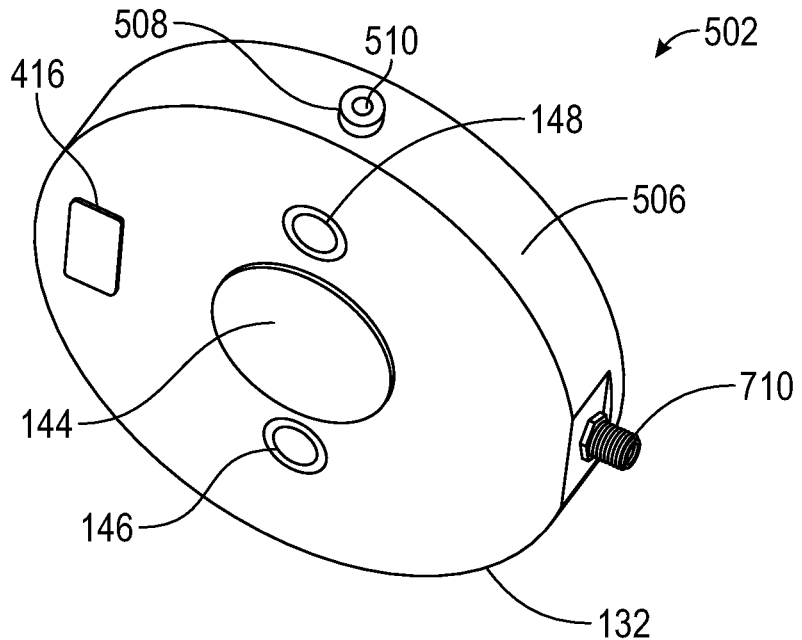
FIG. 19 is a bottom perspective view of the embodiment of FIG. 18.
Figure 20:
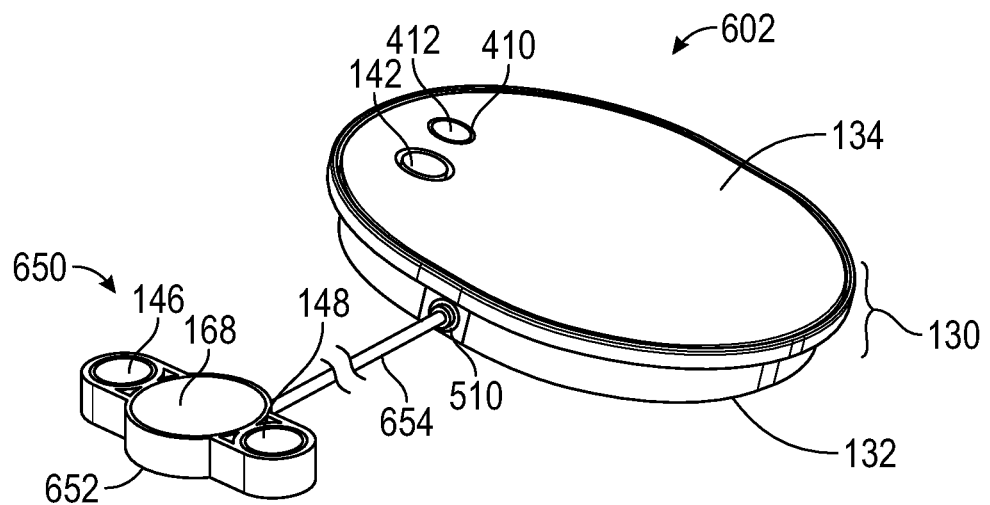
FIG. 20 is a top perspective view of one of many embodiments of a sensor module having an external transducer according to the disclosure.
Figure 21:
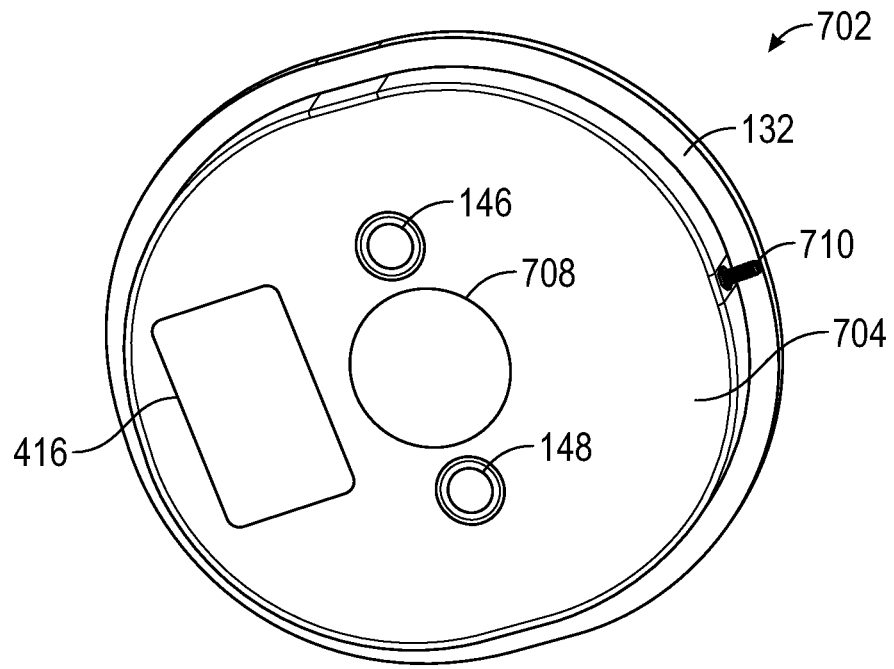
FIG. 21 is a bottom perspective view of one of many embodiments of a sensor module without a transducer aperture according to the disclosure.
Figure 22:
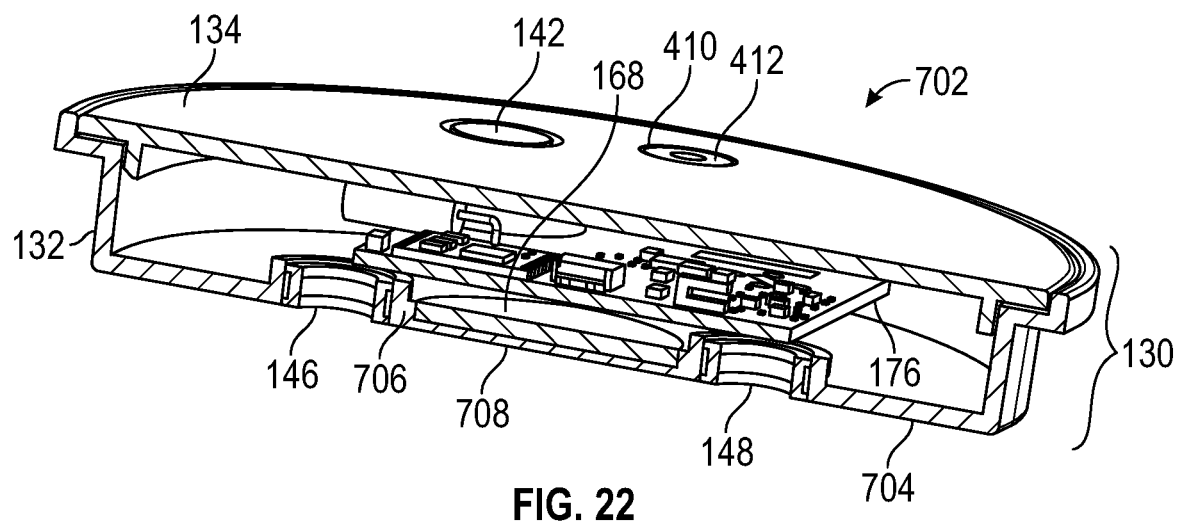
FIG. 22 is a perspective cross-sectional view of the embodiment of FIG. 21.
Figure 23:
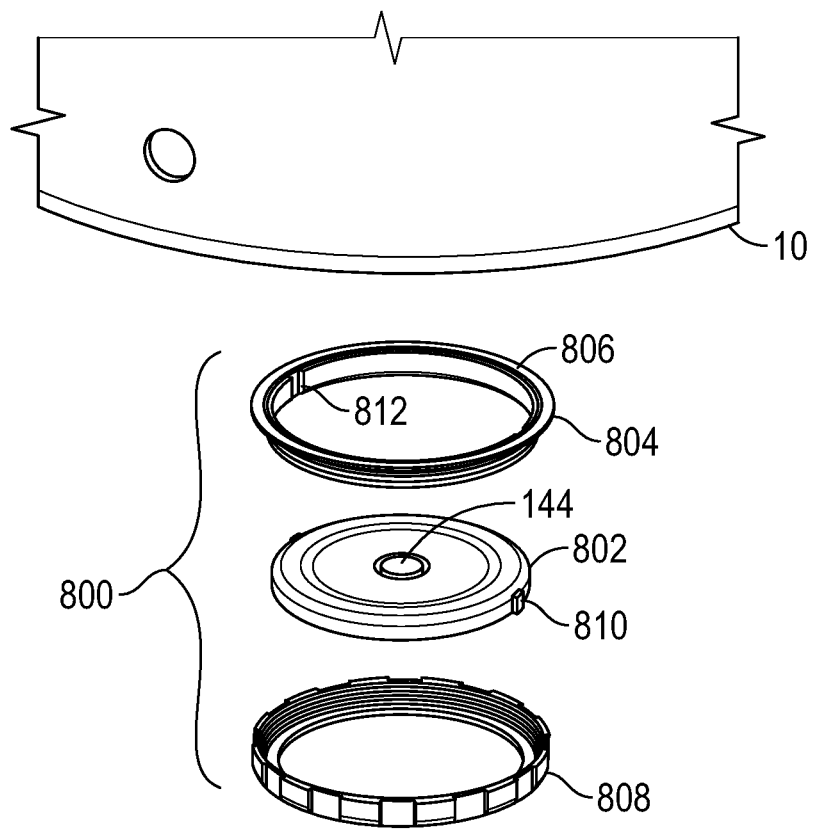
FIG. 23 is a top perspective exploded view of another of many embodiments of a sensor arrangement according to the disclosure.
Figure 24:
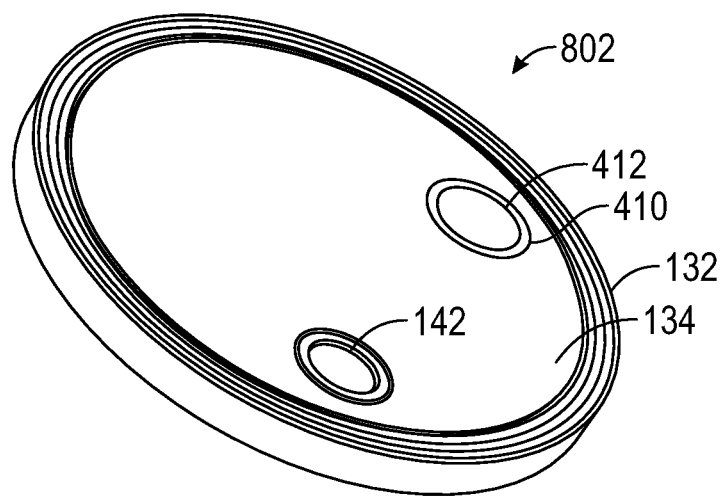
FIG. 24 is a top perspective view of another of many embodiments of a sensor arrangement according to the disclosure.
Figure 25:
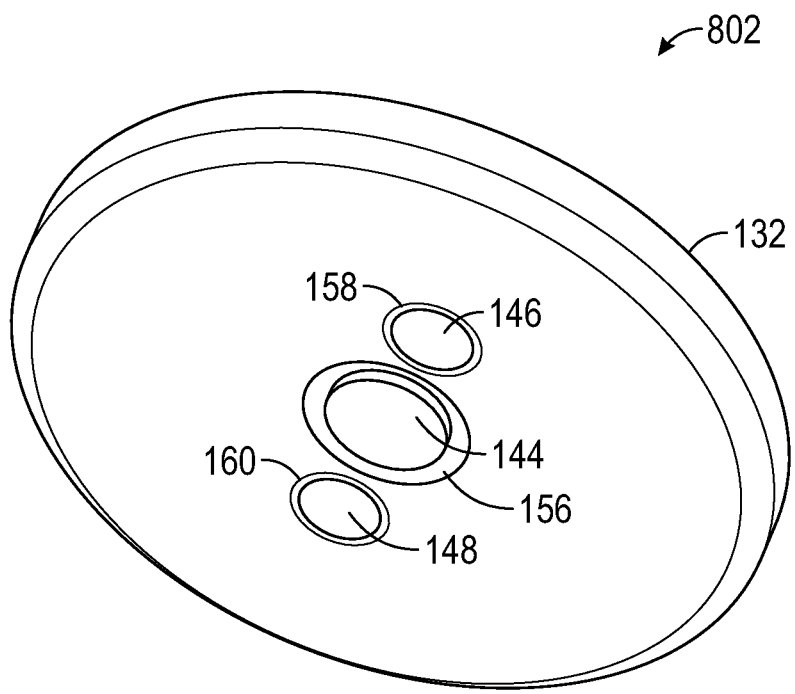
FIG. 25 is a bottom perspective view of the embodiment of FIG. 24.
Figure 26:
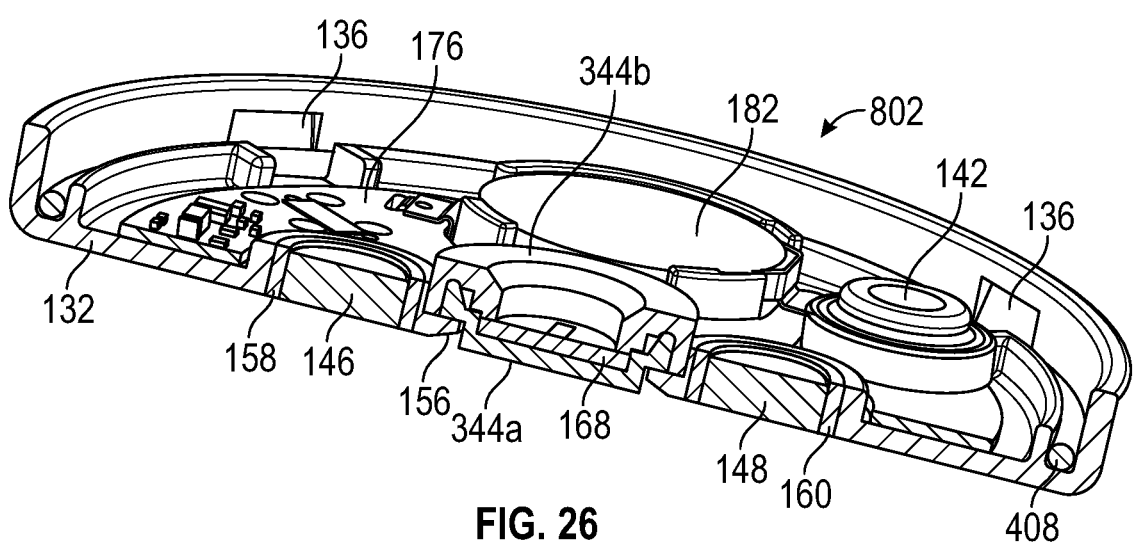
FIG. 26 is a top perspective cross-sectional view of the embodiment of FIGS. 24-25.
Figure 27:
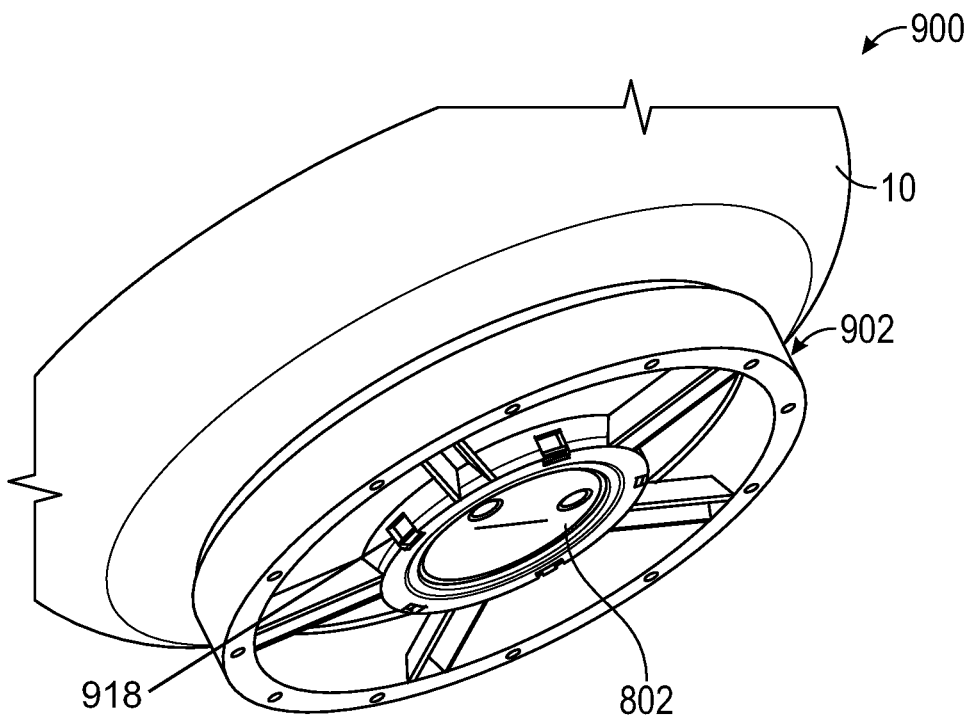
FIG. 27 is a top perspective view of another of many embodiments of a sensor arrangement coupled to a tank according to the disclosure.
Figure 28:
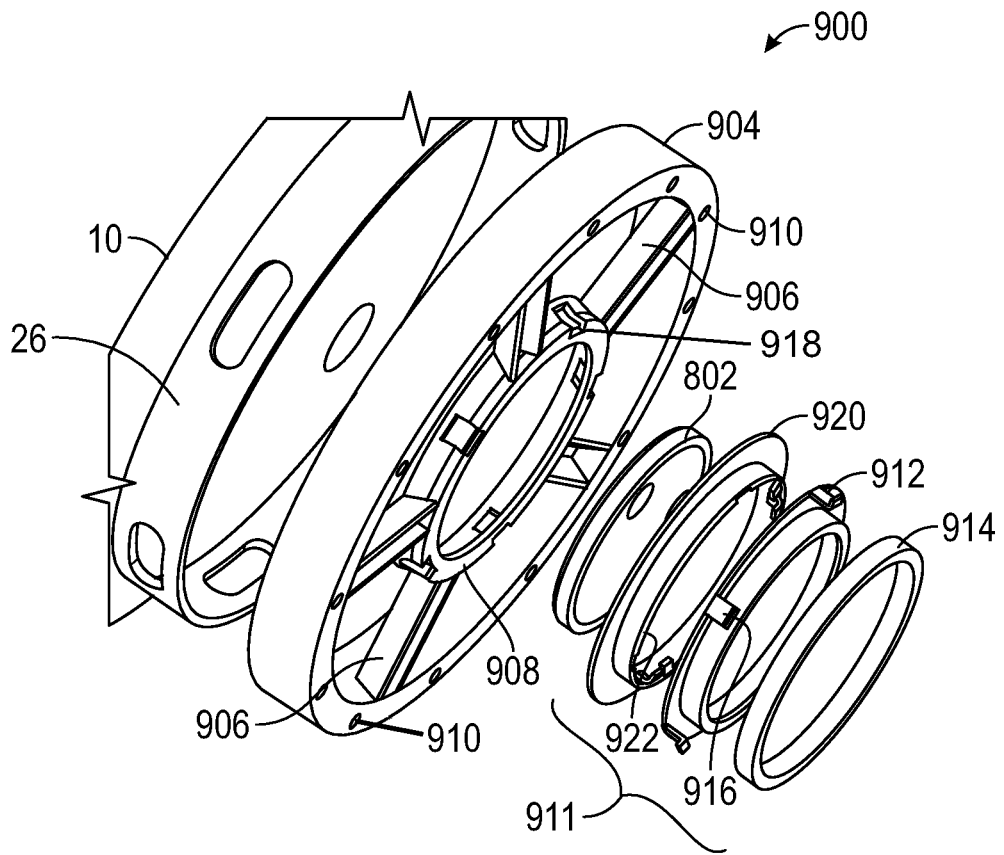
FIG. 28 is an exploded view of the embodiment of FIG. 27.
Figure 29:
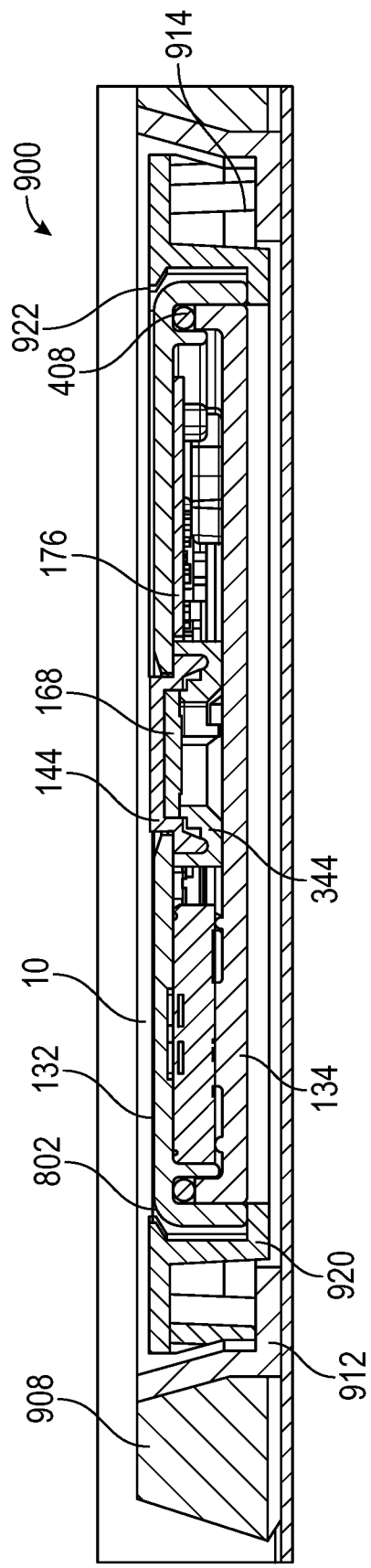
FIG. 29 is a side cross-sectional view of the embodiment of FIGS. 27-28.
Figure 30:
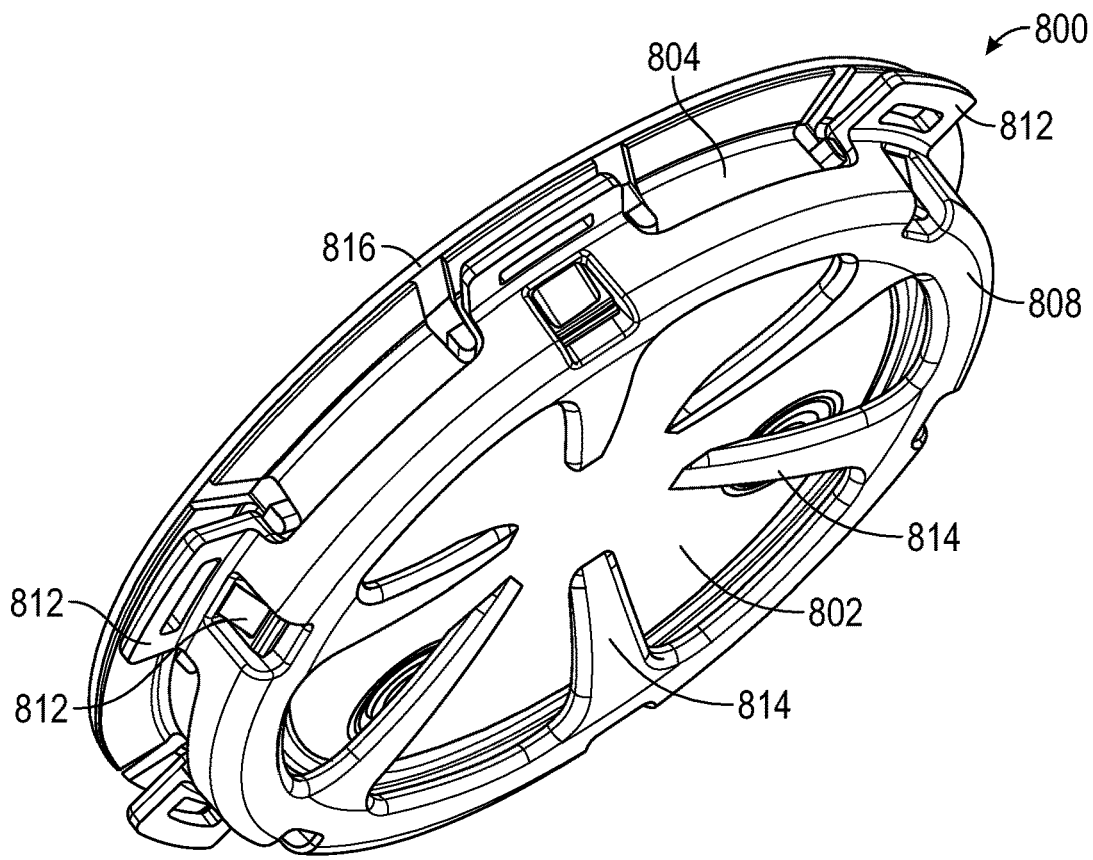
FIG. 30 is a bottom perspective view of yet another of many embodiments of a sensor arrangement according to the disclosure.
Figure 31:
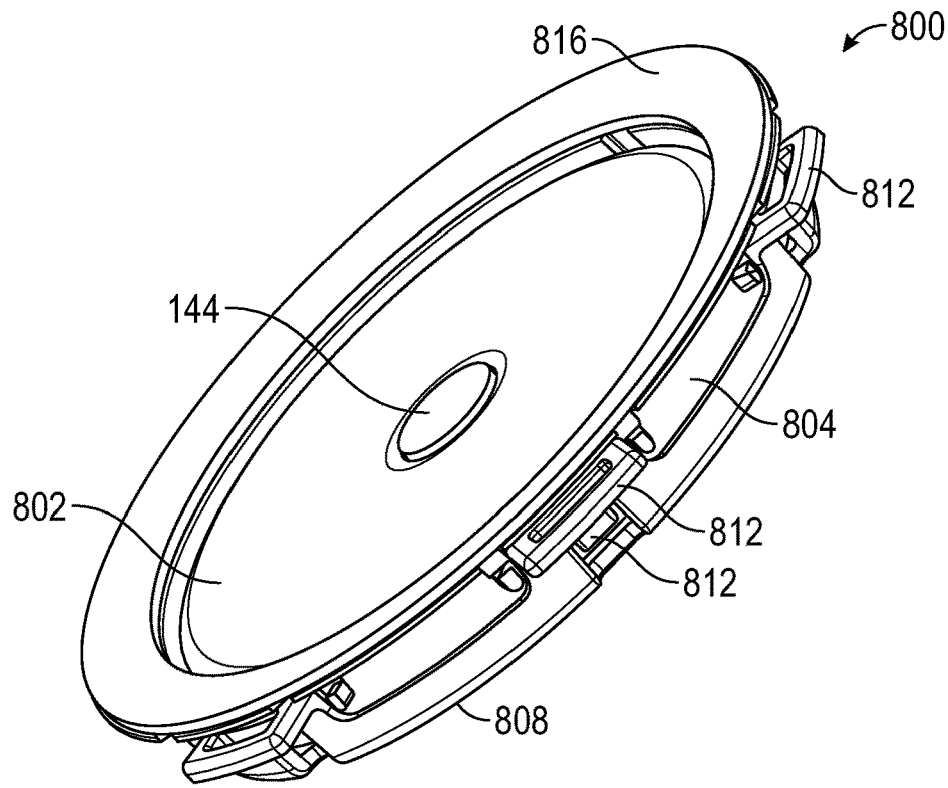
FIG. 31 is a top perspective view of the embodiment of FIG. 30.
Figure 32:
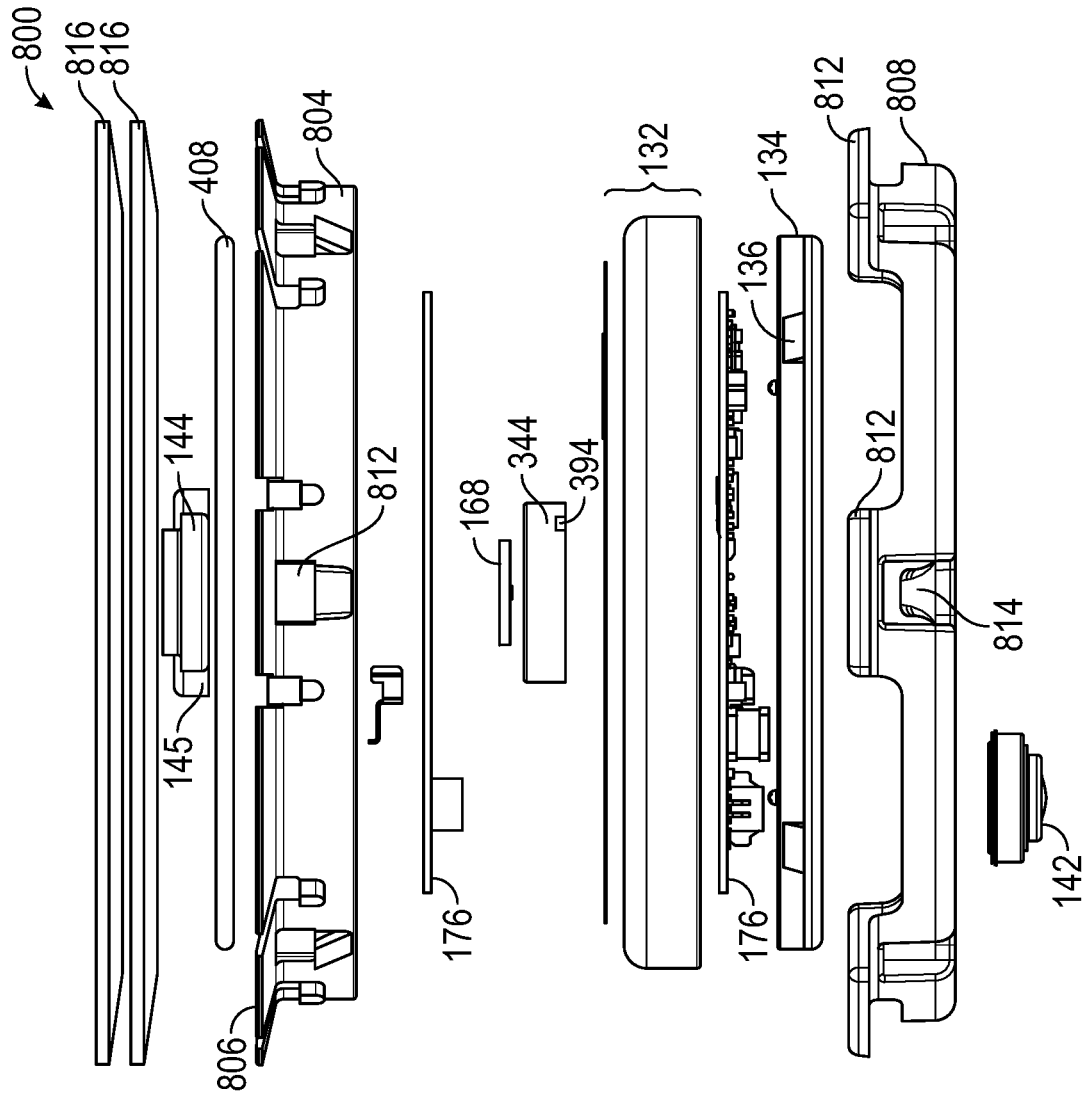
FIG. 32 is an exploded side view of the embodiment of FIGS. 30-31.
Figure 33:
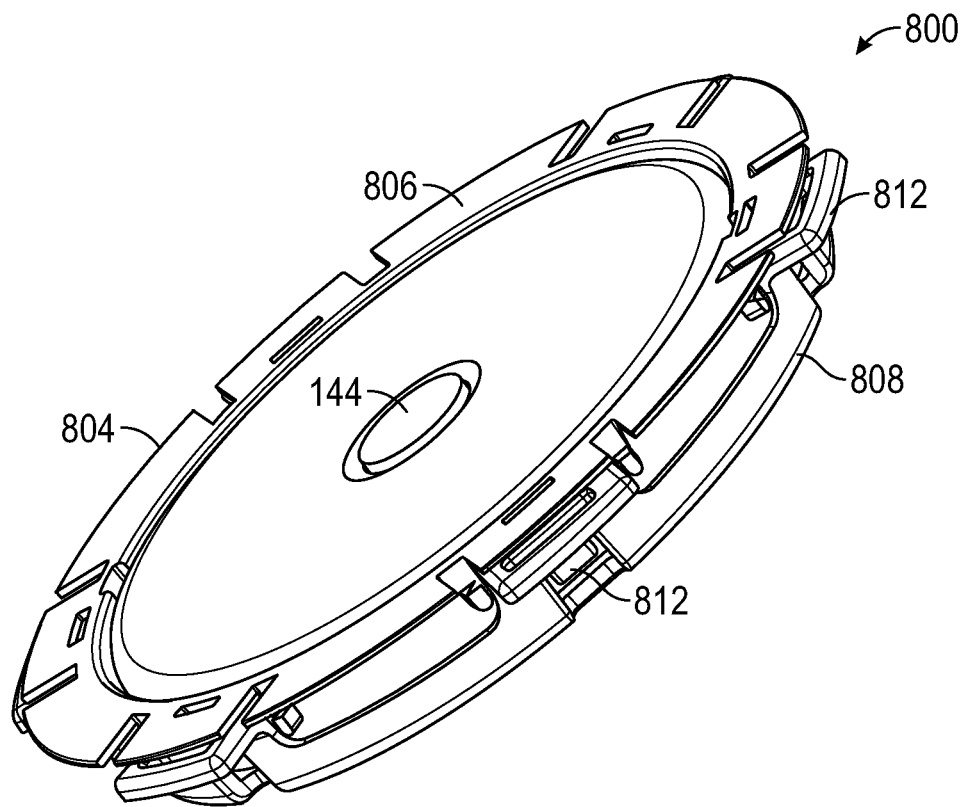
FIG. 33 is a top perspective view of still another of many embodiments of a sensor arrangement according to the disclosure.
Figure 34:
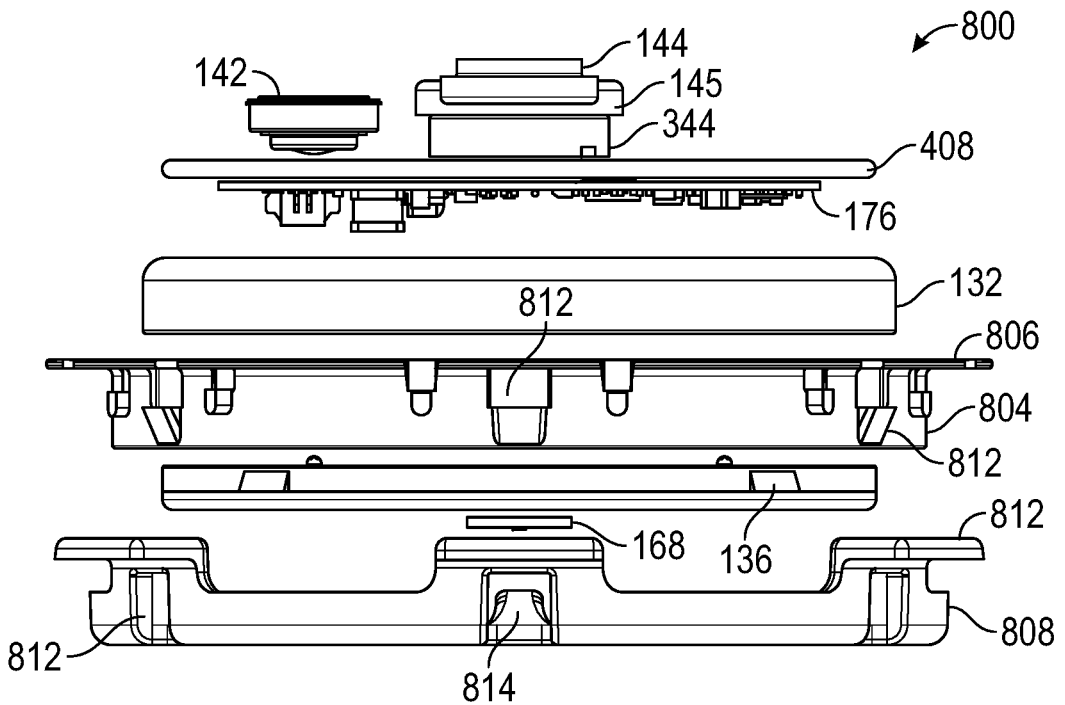
FIG. 34 is an exploded side view of the embodiment of FIG. 33.
Figure 35:
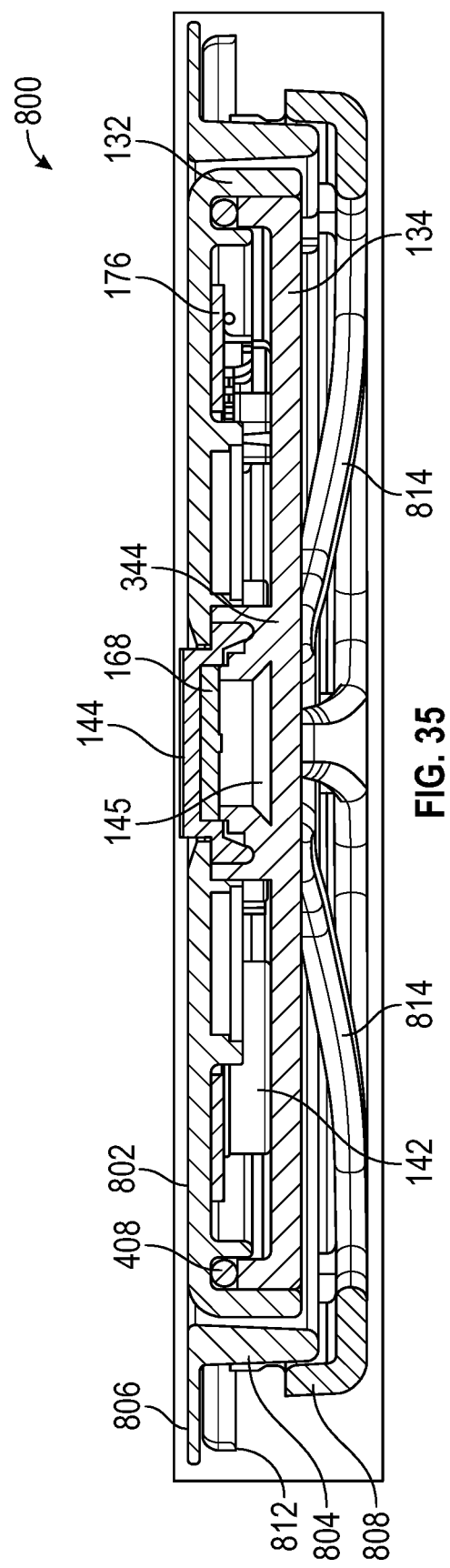
FIG. 35 is a side cross-sectional view of the embodiment of FIGS. 33-34.

FIG. 1 is an exploded schematic view of a sensor arrangement in accordance with an exemplary embodiment of the present disclosure, showing a sensor module exploded away from a tank bottom and communicative with one or more display modules. FIG. 2 is a perspective view of the sensor module illustrated in FIG. 1, showing the sensor module mounted to a tank bottom for determined height of liquid overlaying the sensor module. FIG. 3 is a perspective view of the sensor module illustrated in FIG. 1, showing a ground-side body of sensor module housing. FIG. 4 is a perspective view of the sensor module illustrated in FIG. 1, showing a tank-side body of the sensor module housing. FIG. 5 is an exploded perspective view of the sensor module illustrated in FIG. 1, showing magnet seats and a transducer aperture of the sensor module housing. FIG. 6 is a partial cross-sectional view of the sensor module illustrated in FIG. 1, showing a transducer and couplant seated within a housing aperture of the sensor module. FIG. 7 is a partial cross-sectional view of the sensor module illustrated in FIG. 1, showing the couplant in a relaxed state and a compressed state. FIG. 8 is an exploded perspective view of the sensor module illustrated in FIG. 1, showing a controller and battery contained within an interior of the sensor module. FIG. 9 is a schematic view of the sensor arrangement of FIG. 1, showing a controller and elements connected thereto within the sensor module. FIG. 10 is a schematic view of the display module of FIG. 1, showing a controller and elements connected thereto within the display module. FIG. 11 is an exploded perspective of another embodiment of the sensor module, showing a couplant with a flange defined at a periphery of the couplant. FIG. 12 is a flowchart of a method of acquiring acoustic measurements of liquid height in a tank using an acoustic sensor, showing selection between first and second sampling rates according to whether a synchronization input is present and whether tank motion is present. FIG. 13 is a perspective view of one of many embodiments of a foot for a tank according to the disclosure. FIG. 14 is a top perspective cross-sectional view of one of many embodiments of a sensor module according to the disclosure. FIG. 15 is a bottom perspective view of another of many embodiments of a sensor module according to the disclosure. FIG. 16 is a top perspective view of the embodiment of FIG. 15. FIG. 17 is a top perspective view of the embodiment of FIGS. 15-16 with a portion made transparent. FIG. 18 is a top perspective view of yet another of many embodiments of a sensor module according to the disclosure. FIG. 19 is a bottom perspective view of the embodiment of FIG. 18. FIG. 20 is a top perspective view of one of many embodiments of a sensor module having an external transducer according to the disclosure. FIG. 21 is a bottom perspective view of one of many embodiments of a sensor module without a transducer aperture according to the disclosure. FIG. 22 is a perspective cross-sectional view of the embodiment of FIG. 21. FIG. 23 is a top perspective exploded view of another of many embodiments of a sensor arrangement according to the disclosure. FIG. 24 is a top perspective view of another of many embodiments of a sensor arrangement according to the disclosure. FIG. 25 is a bottom perspective view of the embodiment of FIG. 24. FIG. 26 is a top perspective cross-sectional view of the embodiment of FIGS. 24-25. FIG. 27 is a top perspective view of another of many embodiments of a sensor arrangement coupled to a tank according to the disclosure. FIG. 28 is an exploded view of the embodiment of FIG. 27. FIG. 29 is a side cross-sectional view of the embodiment of FIGS. 27-28. FIG. 30 is a bottom perspective view of yet another of many embodiments of a sensor arrangement according to the disclosure. FIG. 31 is a top perspective view of the embodiment of FIG. 30. FIG. 32 is an exploded side view of the embodiment of FIGS. 30-31. FIG. 33 is a top perspective view of still another of many embodiments of a sensor arrangement according to the disclosure. FIG. 34 is an exploded side view of the embodiment of FIG. 33. FIG. 35 is a side cross-sectional view of the embodiment of FIGS. 33-34. FIGS. 1-35 are described in conjunction with one another.

Referring to FIG. 1, an exemplary sensor arrangement 100 is shown. Sensor arrangement 100 includes a sensor module 102 and a display module, which can be either or both of a multipurpose device 104 or a dedicated device 106. Sensor module 102 can be in wireless communication with multipurpose device 104 and/or dedicated device 106 through a wireless link 108. Wireless link 108 can be a low-power wireless link. Examples of suitable wireless links include Bluetooth, Wi-Fi, Wi-Fi-Direct, NFC, or any other current (or future) wireless link. In certain embodiments, wireless link 108 can be a Bluetooth Low Energy (BLE) wireless link, which lengthens the time between battery replacement for battery-containing elements of sensor arrangement 100. In contemplated embodiments, wireless link 108 can be a simplex wireless link, data communication over wireless link 108 originating solely from sensor module 102.

Sensor module 102 mounts to a tank 10. In the illustrated exemplary embodiment, tank 10 is a vertical tank. This is for illustration purposes only and is non-limiting. In contemplated embodiments, sensor module 102 can mount to a horizontal tank or tank of any other arrangement, as suitable for a given application.

Exemplary tank 10 can be a portable tank having a bottom 12 and containing within its interior a liquid 14. Liquid 14 has a height 16 and a surface 18, surface 18 overlaying tank bottom 12 and being separated therefrom by height 16. In the illustrated exemplary embodiment, liquid 14 includes liquefied propane gas (LPG). This is for illustration purposes only and is non-limiting. It is to be understood and appreciated that the sensor arrangements, sensors systems, and methods described herein can be used with other types of liquid, as suitable for a given application.

Sensor module 102 can be acoustically coupled to surface 18 through height 16 of liquid 14 and tank bottom 12. Sensor module 102 can be arranged to transmit acoustic pulses, e.g., acoustic pulse 20, into liquid 14. Sensor module 102 can be also arranged to receive reflected acoustic pulses, e.g., reflected acoustic pulse 22, from surface 18 through liquid 14 and tank bottom 12. Sensor module 102 can be further arranged to provide data 24 indicative of height 16 to either or both of multipurpose device 104 and dedicated device 106.

Dedicated device 106 can be arranged to receive data 24 via wireless link 108. Upon receipt of data 24, dedicated device 106 uses an on-board computing resource to determine height 16 based on data 24, and provides an indication of height 16 to a graphical user interface (GUI) 110 of a user interface 112 of dedicated device 106. In certain embodiments, GUI 110 can be a fuel-gauge type display that graphically presents an indication of height 16 in relation to a 'tank empty' and a 'tank full' benchmark. It is contemplated that dedicated device 106 solely provide information relating to height of liquid within a tank. In contemplated embodiments, dedicated device 106 can be arranged to report respective heights of liquids in two or more tanks.

Multipurpose device 104 can be similar to dedicated device 106 with the difference that multipurpose device 104 provide functionality beyond that relating to liquid height in a tank. For example, multipurpose device 104 can be a mobile device, e.g., a mobile telephone, with a user interface 114 arranged to display a GUI 116 graphically presenting indication of height 16. In certain embodiments, multipurpose device 104 can be a mobile telephone having recorded thereon an application, as will be described, which receives data 24 and determines height 16 based on data 24 using on-board computing resources of the mobile devices. As will be appreciated by those of skill in the art, utilizing the on-board computing resources remote from sensor module 102 can prolong the expected life of batteries used to provide power to sensor module 102.

With continuing reference to FIG. 1, sensor arrangement 100 also includes one or more feet 118. Feet 118 are optional and can be formed from an elastomeric material 1205, such as rubber and/or one or more other materials, such as aluminum or another metal. One or more feet 118 can be configured to removably seat on a foot ring 26 of tank 10. In this respect, feet 118 can include a slot 122 which tapers in the downward direction of feet 118. It is contemplated that feet 118 (shown in, e.g., FIGS. 1-2) increase space available beneath tank 10 for a width 117 of sensor module 102, simplifying the construction of sensor module 102. In contemplated embodiments, feet 118 improve the quality of wireless link 108, thereby reducing the amount of power required for sensor module 102 to communicate wirelessly using wireless link 108, improving the life of one or more batteries providing power to sensor module 102. In further contemplated embodiments, feet 118 improve the acoustic characteristics of tank 10.

With reference to FIG. 2, sensor module 102 and feet 118 are shown. Sensor module 102 can be removably mounted to tank bottom 12 of tank 10. Feet 118 are also removably mounted to foot ring 26 of tank 10. Removably mounting sensor module 102 and feet 118 to tank 10 allows sensor module 102 and feet 118 to be readily applied to a replacement tank, allowing sensor arrangement 100 (shown in FIG. 1) to be used in conjunction with a cylinder exchange service, such as Blue Rhino® cylinder exchange services available from the Ferrelgas Corporation of Overland Park, Kansas. In at least one embodiment, feet 118 can be or include a plurality of individual feet or segments, such as shown for illustrative purposes in FIGS. 1-2. As another example, feet 118 can be or include an at least partially continuous ring (see, e.g., FIG. 13). In either case, feet 118 can include one or more couplers 119 (see FIG. 13), such as tongues or extensions, for supporting coupling of feet 118 to tank 10 or foot ring 26, such as by way of coupling with foot ring 26 via interference fit and/or elastically or plastically deforming upon insertion of foot ring 26 into slot 122.

With reference to FIG. 3, a sensor module 102 is shown. Sensor module 102 includes a housing 130. Housing 130 includes a tank-side body 132 and a ground-side body 134 removably connected to one another by one or more fasteners 136. Fasteners 136 allow for separation of ground-side body 134 from tank-side body 132, thereby providing access to an interior 138 (shown in FIG. 6) of sensor module 102 and enabling replacement of one or more batteries 182 disposed therein (see, e.g., FIGS. 8, 16, 19). As used herein, "tank-side" generally refers to a side of housing 130 that faces towards a tank during sensor operations (e.g., in a sensing direction of a transducer) and "ground-side" generally refers to a side of housing 130 that faces away from a tank during sensor operations regardless of whether a "ground side" actually faces the ground or another surface beneath a tank (e.g., a ground-side may face horizontally, upwardly or otherwise depending on the orientation of a sensor module according to the disclosure).

Ground-side body 134 has a user interface 142 disposed thereon. In the illustrated exemplary embodiment, user interface 142 includes a 'sync' button for synchronizing sensor module 102 with sensor arrangement 100 (shown in FIG. 1). This provide synchronization functionality to sensor arrangement 100, receipt of a user input at user interface 142 causing sensor module 102 to incorporate a sync indicia with advertisement packets, e.g., data 24 (shown in FIG. 1). The sync indicia allows sensor arrangement 100 to recognize data provided by sensor module 102, and provides an introduction of sensor module to dedicated device 106 and/or multipurpose device 104 when otherwise unrecognized.

With reference to FIG. 4, tank-side body 132 of sensor module 102 is shown. Tank side body 132 includes a couplant 144, e.g., a couplant body, a first magnet 146, and a second magnet 148. Couplant 144 can be fixed to housing 130 along a longitudinal axis of sensor module 102, and can be offset longitudinally along the length of housing 130.

Couplant 144 includes resilient material 150. Resiliency allows sensor module 102 to be switched between tanks, e.g., tank 10, and provide acoustic communication suitable for measuring liquid notwithstanding differences between respective tank bottom, e.g., rust, cleanliness, grade of steel, etc. In certain embodiments, resilient material 150 includes a viscoelastic urethane polymer or silicon rubber material. Examples of such materials include Sorbothane®, available from Sorbothane, Inc. of Kent, Ohio.

Couplant 144 can also be tacky and/or may include a tackifier 152 to provide tackiness. Tackiness improves adhesion between couplant 144 and tank bottom 12 (shown in FIG. 1). Tackiness also enables couplant 144 to sealably isolate interior 138 (shown in FIG. 5) from the external environment.

As shown in FIG. 11, a couplant 244 can be similar to couplant 144 and can include a flange 245. Flange 245 can be defined about at least a portion of the couplant periphery and seats against an inner surface extending about at least a portion of the periphery of couplant 244. Couplant 244 seats within tank-side body 232 such that flange 245 seats against an inner surface 233 of tank-side body 232, couplant 244 thereby being captive within housing 230 between controller 276 and/or ground-side body 234 and tank-side body 232. As will be appreciated by those of skill in the art in view of the present disclosure, flange 245 can also improve water resistance of sensor module 202 by providing additional sealing between aperture 156 (see, e.g., FIG. 8) and the external environment. In contemplated embodiments, flange 245 eliminates the need to couple transducer 268 to couplant 244 with an adhesive, simplifying assembly and reducing cost of sensor module 202.

In at least one embodiment, a couplant 344 can be or include a multi-piece couplant (see, e.g., FIG. 14). For example, couplant 344 can include one couplant portion 344a for contacting a tank body and another couplant portion 344b for at least partially supporting the coupling of couplant portion 344a with tank-side body 332 and/or one or more other components of sensor module 302, such as a transducer 168 (or 268). Couplant portion 344a can include one or more flanges 345 disposed about at least a portion of its periphery for seating against an inner surface 333 of tank-side body 332. Transducer 168 can be seated in or on, or otherwise coupled, to an interior side of couplant portion 344a, which can but need not include a seat 347 for at least partially surrounding the transducer, whether by interference fit, clearance fit or otherwise. Couplant portion 344b can be configured to couple with couplant portion 344a for holding couplant portion 344a against surface 333 and/or for holding transducer 168 against couplant portion 344a, whether separately or in combination with one or more other components of module 302. For example, couplant portion 344b can be coupled to tank-side body 332 in one or more locations radially outside of couplant portion 344a, such as by adhesive, heat staking, or the use of one or more fasteners, separately or in combination. As another example, couplant portion 344b can alternatively or collectively be held in place against or biased toward inner surface 333 (and/or couplant portion 344a and transducer 168) by one or more other components of sensor module 302, such as a controller, PCB, mount, support, brace or other structure disposed between couplant portion 344b and ground-side body 334. In at least one embodiment, which is but one of many, couplant portion 344b can have one or more openings 393 and/or slots 394 therein or therethrough, such as for routing one or more wires 395 coupled to transducer 168. Opening 393 can but need not be at least partially filled or covered with epoxy or another material 145 (see, e.g., FIG. 32) for supporting proper operation of transducer 168 and/or coupling one or more components of the sensor module together. As another example, couplant portion 344*b* can include one or more grooves 396 for coupling with one or more tongues 397 of couplant portion 344*a* (or vice versa) to at least partially support sealing engagement with inner surface 333. For instance, tongue 397 can have one or more dimensions greater than one or more dimensions of groove 396 such that when couplant 344 is coupled to tank-side body 332, tongue 397 is at least partially compressed or otherwise deformed within at least a portion of groove 396 for helping ensure sealing engagement between couplant 344 and tank-side body 332. Couplant portion 344*b* can be made from any material(s) according to an implementation of the disclosure, such as an elastomeric material (e.g., silicone, rubber, etc.) or a more rigid material (e.g., plastic, metal, etc.), separately or in combination, in whole or in part. In at least one embodiment, sensor module 302 can include one or more structures for supporting coupling of couplant 344 with tank-side body 332, such as, for example, a seat 398 for receiving at least a portion of couplant 344 or a wall 399 for coupling with at least a portion of couplant 344, such as a radial exterior or other portion (e.g., by interference fit, via adhesive, or otherwise).

With continuing reference to FIG. 4, first magnet 146 can be laterally offset from couplant 144 on a first side of couplant 144. Second magnet 148 can be laterally offset from couplant 144 on a side of couplant 144 opposite first magnet 146. Laterally offsetting second magnet 148 on a side of couplant 144 opposite first magnet 146 can enable the magnetic force of first magnet 146 and second magnet 148 to compressively deform couplant 144, improving acoustic communication between couplant 144 and tank 10 (shown in FIG. 1). In embodiments, resilient material 150 can have a hardness that can be between about 20 Shore OO and about 40 Shore OO, such as between 15 Shore OO and 45 Shore OO. Hardness in this range can enable cooperation with relatively inexpensive, suitably sized, magnets to compress couplant 144 and maintain sensor module 102 in position on tank bottom 12.

It is contemplated that first magnet 146 and second magnet 148 have an attractive force F that can be greater than a compressive strength C of couplant 144, facilitating compression of couplant 144 when proximate tank bottom 12 (shown in FIGS. 1-2). Couplant 144 can also include a tackifier 152, thereby providing of adherence to tank bottom 12. The tackifier 152 can also provide adherence of the couplant 144 to a transducer 168 (shown in FIG. 5).

With reference to FIG. 5, elements coupled to tank-side body 132 are shown exploded away from tank-side body 132. Tank-side body 132 defines an aperture 156, a first magnet seat 158, and a second magnet seat 160. First magnet seat 158 can be disposed between aperture 156 and a first lateral edge of tank-side body 132. First magnet 146 can be captive within first magnet seat 158, such as through a press-fit or by operation of an optional adhesive or bond material 162. Optional adhesive or bond material 162 provides sealing about the periphery of first magnet seat 158, isolating interior 138 from the external environment and allowing first magnet seat to be arranged as a through aperture.

Second magnet seat 160 can be similar to first magnet seat 158 with the difference that second magnet seat 160 can be disposed on a side of aperture 156 opposite first magnet seat 158. Second magnet 148 can be press-fit or bonded within second magnet seat 160. An adhesive or bond material 162 may also be interposed between second magnet 148 and tank-side body 132, providing sealing and adhesion therebetween.

Aperture 156 can be centrally disposed between opposite lateral edges of tank-side body 132, and can be longitudinally offset along a longitudinal length of tank-side body 132. Aperture 156 can be a stepped aperture and includes a transducer lip 164 and a couplant lip 166. Transducer lip 164 can be proximate interior 138. Transducer 168 can be seated in aperture 156 and supported about at least a portion of its periphery by transducer lip 164. In the illustrated exemplary embodiment, transducer lip 164 can be segmented. In this respect, segmented transducer lip 164 includes a plurality of circumferentially arranged arcuate segments 165. The circumferentially arranged arcuate segments 165 fix axially corresponding segments of transducer 168, providing suitable rigid support while allowing suitable mechanical displacement of transducer 168 to generate or respond to acoustic pulses, e.g., acoustic pulse 20 (shown in FIG. 1) and reflected acoustic pulse 22 (shown in FIG. 1).

Couplant lip 166 can be disposed axially on a side of transducer lip 164 opposite interior 138, has a width that can be greater than the width of transducer lip 164, and can be radially outward of transducer lip 164. Couplant 144 can be seated about its periphery on couplant lip 166. Couplant lip 166 can be circumferentially continuous, couplant 144 thereby sealably seating over transducer 168 and isolating interior 138 from the external environment.

With reference to FIG. 6, transducer 168 is shown. Transducer 168 can be interposed within aperture 156 axially between couplant 144 and tank-side body 132. At a peripheral edge portion 171, transducer 168 can be rigidly supported by transducer lip 164. At an interior portion 172, transducer 168 can be unsupported and can be free to vibrate, i.e., according to acoustic pulses generated or received. One or more micro wires 174 disposed within interior 138 connect transducer 168 with a controller 176, thereby placing transducer 168 in communication with controller 176. The radius of couplant lip 166 exceeds a radius of couplant 144, couplant 144 and tank-side body 132 defining therebetween an expansion gap 178.

With reference to FIG. 7, couplant 144 is shown in an uncompressed state I and in a compressed state II. In the uncompressed state I, couplant 144 has a block-like shape and extends beyond a surface 180 of tank-side body 132 along substantially its entire length, and expansion gap 178 can be vacant. Upon mounting of sensor module 102 against tank bottom 12 (shown in FIG. 1), couplant 144 deforms. In this respect, when compressive force D is exerted against couplant 144 a portion of resilient material 150 can flow into expansion gap 178. The flow allows couplant 144 to form-fit to a contour of tank bottom 12, facilitating acoustic coupling between transducer 168 and tank bottom 12, and placing sensor module 102 in acoustic communication between sensor module 102 and liquid 14 (shown in FIG. 1) overlaying sensor module 102.

With reference to FIG. 8, controller 176 is shown. Controller 176 can be disposed within interior 138 and includes a battery 182 and a coil 184. Battery 182 can be electrically connected to controller 176 and can be operatively connected to coil 184. It is contemplated that controller 176 be configured to allow a voltage to cyclically accumulate within coil 184 and be applied to transducer 168 via micro wire 174. Transducer 168 can include a piezo element that changes size upon application of the voltage, the size change generating an acoustic pulse that can be communicated to tank bottom 12 through couplant 144.

It is contemplated that battery 182 can be a low-power battery. Battery 182 can be a coin-cell battery. Examples of suitable batteries include CR2032 batteries, which allow for the thickness of sensor module 102 to be sufficiently small that sensor module 102 can fit within the clearance defined between the bottom of foot ring 26 (shown in FIG. 1) and tank bottom 12 (shown in FIG. 1). In certain embodiments, one or more feet 118 can provide additional clearance (see, e.g., FIGS. 1, 2 and 13), such as when insufficient clearance exists in the absence of feet 118.

With reference to FIG. 9, sensor module 102 is shown. Sensor module 102 includes controller 176, user interface 142, transducer 168, and a wireless module 186. Sensor module 102 can also include an optional accelerometer 187.

Controller 176 can be operatively connected to transducer 168 and wireless module 186 to generate data 24, which wireless module 186 provides to wireless link 108. Controller 176 can also be connected to user interface 142 and can be arranged to receive therethrough a synchronization input S from a user, such as from an externally accessible 'sync' button arranged on the exterior of sensor module 102. Controller 176 can be further connected to accelerometer 187 and can be arranged to receive therefrom a signal including data indicative of motion of tank 12 (shown in FIG. 1).

Controller 176 includes a processor 188 and a memory 190. Memory 190 includes a non-transitory machine-readable medium having a plurality of program modules 192 recorded thereon containing instructions that, when read by processor 188, cause controller 176 to execute certain operations. It is contemplated that the instructions cause sensor module 102 to acquire data indicative of height 16 (shown in FIG. 1) of liquid 14 (shown in FIG. 1), compress the data, and provides the compressed data wirelessly to display module 106 (shown in FIG. 1).

With respect to acquiring data indicative of liquid height, the instructions cause transducer 168 to generate an acoustic pulse, e.g., acoustic pulses 20 (shown in FIG. 1). The acoustic pulse can be communicated into liquid overlaying the tank bottom, e.g., tank bottom 12 (shown in FIG. 1). Once communicated into the liquid, the acoustic pulse travels upwards (relative to gravity) through the liquid until the acoustic pulse encounters the liquid surface, e.g., liquid surface 18 (shown in FIG. 1). The liquid surface reflects the acoustic pulse from the surface downwards (relative to gravity), towards the transducer, which receives the reflected acoustic pulse.

It is contemplated that the instructions also can cause the controller to record a waveform generated by the transducer for a predetermined time interval subsequent to generation of the acoustic pulse by the transducer, the waveform memorializing return of the reflected acoustic pulse as one or more waveform peaks in the waveform. In an exemplary embodiment, the waveform can be recorded for between about two (2) milliseconds and about four (4) milliseconds, as appropriate for the height of liquid contained by the tank when full. These exemplary time values can allow for reflecting of an acoustic pulse in liquid propane where the liquid surface can be disposed between about 30 inches and about 60 inches above the transducer.

Once the predetermined time interval has tolled, the instructions cause the controller to compress the waveform. Compressing the waveform includes identifying peaks in the waveform generated during the predetermined time interval subsequent to generation of the acoustic pulse. A peak (or peaks) of the waveform can be identified and packaged into an advertisement package, e.g., exemplary data structure 24. In certain embodiments, the advertisement package can be a 31-byte package. In accordance with certain embodiments, the advertisement package can include between six (6) and ten (10) peaks, e.g., eight (8) peaks, as suitable for a given application. It is contemplated that numbers of peaks in these ranges do not occupy the available space within the advertisement package, allowing space for data such as synchronization input S, temperature data, and/or accelerometer data. Only sending the peaks, as opposed to the entire waveform, minimizes the amount of data necessary to communicate to the display module for purposes of re-representing the data for processing resources in the display module.

Once compressed, the advertisement package can be conveyed wirelessly by wireless module 108 to display module. Display module receives the advertisement package 24, calculates the time interval between generation of the acoustic pulse and receipt of the reflected acoustic pulse, and determines the height of the liquid overlaying the transducer based on the calculated time interval between generation of the acoustic pulse and receipt of the reflected acoustic pulse. As will be appreciated by those of skill in the art in view of the present disclosure, compressing the data at the sensor module assembly can reduce the amount of power required to operate sensor module 102, lengthen the service life and/or reducing the cost of the sensor module battery. As will also be appreciated by those of skill in the art in view of the present disclosure, using the processing resources of display module, e.g., a user cellular phone 104, can reduce cost of sensor module 102 by reducing the processing resources incorporated in sensor module 102.

Referring to FIG. 10, an exemplary embodiment of a display module, e.g., dedicated display module 106 and/or multifunctional display module 104, is shown. Display module 106 includes a controller 101 with a processor 103, user interface 112 with GUI 110, and a wireless module 105. Controller 101 can be operatively connected to wireless module 105 and user interface 112, and can be configured to receive data 24 from sensor module 102 via wireless module 105. Controller 101 can be also configured to recognize sensor module 102 upon receipt of data including synchronization indicator S (shown in FIG. 9), controller 101 thereafter recognizing data received from sensor 102 and determining liquid height 16 (shown in FIG. 1) using data 24.

Controller 101 includes a memory 107. Memory 107 includes a non-transitory machine-readable medium with a plurality of program modules 109 having instructions recorded thereon that, when read by processor 103, cause controller 101 to execute certain operations. The instructions generally cause controller 101 to convert the identified peak (or peaks) into a liquid height at dedicated display module 106. In particular, the instructions cause controller 101 to calculate a time interval between transducer 168 (shown in FIG. 9) generating an acoustic pulse and the transducer receiving the reflected acoustic pulse, determine height 16 (shown in FIG. 1) of liquid 14 (shown in FIG. 1) overlaying tank bottom 12 (shown on in FIG. 1), and provide indication of the determined height to a user interface, e.g., user interface 110 (shown in FIG. 1), remote from transducer 168.

With respect to calculating the interval and determining the height, the is instructions cause controller 101 to determine the time interval between generating the acoustic pulse, e.g., acoustic pulse 20 (shown in FIG. 1), and the return of the reflected acoustic pulse, e.g., reflected acoustic pulse 22 (shown in FIG. 1). In certain embodiments, the time interval can be plugged into Equation 1, shown below, which solves for height according to the indicated linear relationship using the time interval.

$$\text{Height} = \text{Time Interval} * \text{Speed of Sound}/2 + \text{Offset} \quad \text{Equation 1}$$

In accordance with certain embodiments, the time interval may be compared to a lookup table stored on memory 107 having an association of time intervals and liquid heights. Notably, performing these calculations off-sensor, that is remote from sensor module 102, can allow sensor module 102 to be constructed with less processing resources than would otherwise be required for the sensor arrangement.

With reference to FIG. 12, an exemplary embodiment of a method of determining height of a liquid overlaying the transducer is shown. Once the transducer, e.g., transducer 168 (shown in FIG. 9), is coupled to a tank, e.g., tank 12 (shown in FIG. 1), the sensor module (e.g., sensor module 102) can begin checks for a user input, e.g., from user interface 142 (shown in FIG. 9), as shown with decision box 310.

If user input is present (or has been received within a predetermined time period prior to the inquiry), fluid height measurements are acquired at a relatively high second rate, which can be higher than a first rate which would otherwise be used, as shown with arrow 312 leading to box 320. In contemplated embodiments, a synchronization input causes fluid height measurements to be acquired at a rate of about four (4) times per second for about twenty (20) minutes subsequent to a synchronization input being received, as shown with box 320. As receipt of a synchronization input can be expected when a user is interacting with the sensor module, increased sampling provides increased responsiveness to the user. Relatively prompt responsiveness from the sensor module when a user is manipulating the tank, for example when positioning the sensor on the tank, can improve the user experience.

If user input is not present (and has not been received within the predetermined time interval, liquid height data can be acquired at the first rate, which can be relatively low, as shown with arrow 314 and leading to box 340. For example, in certain embodiments, fluid height measurements are acquired at a rate of about once every 3.5 seconds. As will be appreciated by those of skill in the art in view of the present disclosure, sampling at relatively low rates can reduce power consumption of sensor module 102 and extends the service life of the sensor module battery.

As shown with decision box 330, method 300 can also include determining whether tank motion is present. In the event that tank motion is present, liquid height data can be acquired at a (higher) second rate, as shown with arrow 332 leading to box 320. Tank motion can be detected, for example, using input from an accelerometer incorporated into the sensor module, e.g., accelerometer 187 (shown in FIG. 9). As will be appreciated, obtaining more frequent liquid height measurements can improve the user experience in applications where the tank is mobile, such as when a BBQ grill is moved or cleaned prior to use. Absent indication of tank, liquid height data can be acquired at the (lower) first rate, as shown with arrow 334 leading to box 340.

With continuing reference to the Figures and particular reference to FIGS. 15-17, in at least one embodiment, a sensor module 402 can have a tank-side body 132 configured to be coupled with ground-side body 134, which can include ground-side body 134 having a wall 404, such as a rim, extension or other structure, for being disposed at least partially within a wall 406 of tank-side body 132 (or vice versa, if desired). Walls 404, 406 can be continuous or discontinuous as needed or desired according to an implementation of the disclosure, which can include be comprised of a series of segments or other wall portions. Sensor module 402 can include one or more seals 408 (see, e.g., FIG. 26), such as a gasket or elastomeric ring, coupled to one or more of walls 404, 406 for sealingly engaging walls 404, 406 and/or one or more other portions of sensor module 402 (e.g., when bodies 132, 134 are coupled to one another). As another example, sensor module 402 can include one or more vents 410, such as a covered, uncovered, valved or valveless opening or hole, for allowing fluid communication between the interior of module 402 and an atmosphere surrounding module 402. Vent 410 can at least partially minimize or reduce pressure buildup or vacuum creation within at least a portion of module 402, such as due to changes in temperature, pressure or otherwise. One or more vents 410 can be disposed in tank-side body 132, ground-side body 134 or both. In at least one embodiment, vent 410 can be or include an opening, such as a thru opening, covered with a cover 412, such as a sticker, cloth, lid or patch, made from or comprising a waterproof (or water-resistant), breathable fabric or fabric-like material for allowing air to flow into or out of module 402 while nonetheless at least partially resisting the ingress of water, moisture or contaminants that could potentially harm or damage one or more components of sensor module 402. In at least one embodiment, sensor module 402 can include one or more notches 414, such as an indentation or recess, for supporting access to the interior of module 402 by a user. For instance, one or more notches 414 can be disposed in ground-side body 134 (and/or tank side body 132) and can facilitate uncoupling of bodies 132, 134 from one another, such as during service or maintenance, by allowing a user to more easily uncouple bodies 132, 134 (e.g., with a fingertip or pry tool). As another example, one or more notches 414 can provide clearance for wires, connectors or other components disposed through a wall or body of module 402. In at least one embodiment, sensor module 402 can include one or more recesses 416 (or other locations, which can include raised areas) for affixing labels or other placards to sensor module 402, such as for user instructions, barcodes, branding or other information.

With continuing reference to the Figures and particular reference to FIGS. 18-19, in at least one embodiment, a sensor module 502 can have a ground-side body 134 configured to be disposed at least partially within tank-side body 132, which can include having a wall 504, such as a rim, extension or other structure, for being disposed at least partially within a wall 506 of tank-side body 132. Walls 504, 506 can be continuous or discontinuous as needed or desired according to an implementation of the disclosure, which can include be comprised of a series of segments or other wall portions. In at least one embodiment, sensor module 502 can include one or more ports 508, such as a thru hole or other opening, for routing wires, connectors or other system components into or out of sensor module 502. Sensor module 502 can include one or more plugs 510, such as a cap, lid or insert, configured to couple with a port 508 according to an implementation of the disclosure, such as threadably, via interference fit, via the use of one or more nuts or other fasteners, or otherwise. For example, a plug 510 can be configured to sealingly couple with a port 508, such as when not in use. As another example, plug 510 can be adapted for sealingly routing one or more wires, cables or other system components there through (see, e.g., FIG. 20, which is further described below).

In at least one embodiment, a sensor module 602 can include a sensor 650 disposed outside of housing 130, such as an exterior or remote sensor or sensor arrangement, for allowing placement of one or more transducers 168 at one or more tank locations located one or more distances from housing 130, which can be or include any distance or distances according to an implementation of the disclosure. For example, in at least one implementation of the disclosure, a user may wish to dispose one or more transducers 168 on the bottom, top, side or other portion of one or more tanks and to dispose housing 130 elsewhere, whether on the tank or otherwise. In such an embodiment, which is but one of many, transducer 168 and magnets 146, 148 can be coupled to a sensor carrier 652, such as a frame, housing or other support structure, and carrier 652 can be configured to couple to any desired location on a tank or tank body. Sensor carrier 652 can be operatively coupled with housing 130 with one or more wires or cables 654 or, as another example, wirelessly. In at least one embodiment, sensor 650 can include a couplant (not shown in FIG. 20; see, e.g., FIG. 19 and others) for operably coupling transducer 168 to a tank and/or for sealingly or otherwise protecting transducer 168 from damage due to moisture or the like. As another example, in at least one embodiment, sensor 650 be wholly or partially encased or covered in epoxy or another material (not shown) for protecting one or more components from the elements during sensor operations and/or functioning as a couplant between sensor 650 and a tank body. Two or more sensors 650 can be coupled to housing 130 separately or in combination with one or more transducers disposed within housing 130 such as those described with reference to one or more other Figures of the disclosure. Further, two or more sensors 650 can be configured to sense in the same or different directions as one another and/or as a transducer disposed within housing 130 (if present), which can be or include any direction or directions according to an implementation of the disclosure, such as up, down, horizontally or otherwise.

With continuing reference to the Figures and particular reference to FIGS. 21-22, in at least one embodiment, a sensor module 702 can be configured for sensing through a wall 704 of tank-side body 132 of housing 130 and one or both of aperture 156 (or 256, etc.) and couplant 144 (or 244, etc.) can optionally be absent. Such an embodiment can be advantageous, for example, in implementations of the disclosure where prevention of the ingress of moisture or other contaminants into housing 130 is of particular importance. In at least one embodiment, transducer 168 can be operably coupled to the interior of wall 704, which can but need not include being disposed in a seat 706, and configured for sensing liquid level through wall 704 as well as through the wall or body of a tank being sensed (see, e.g., FIG. 1). In at least one embodiment, sensor module 702 can include one or more recesses 708, such as a relatively thinner wall portion, indentation or other space, in the exterior of wall 704 adjacent to a transducer 168. Recess 708 can be at least partially filled or over-filled with grease, gel, epoxy or another appropriate substance (not shown) for filling any air gap that may otherwise be present between recess 708 and a tank wall, which can enable or facilitate acoustic communication between transducer 168 and liquid disposed within the tank. In at least one embodiment, sensor module 702 can include one or more connectors 710 (see also FIGS. 18-19), such as electrical couplers, disposed in or through housing 130 or a portion thereof for allowing or supporting wired and/or wireless communication between module 702 and one or more other components of a sensor system, such as an external antenna, transmitter, receiver, display or the like.

With continuing reference to the Figures and particular reference to FIGS. 23-35, in at least one embodiment, a sensor system or sensor arrangement 800 can include one or more sensor modules 802 adapted for at least optionally coupling with a tank 10 in a manner other than magnetically or in addition to magnetically (and one or more magnets 146, 148 can optionally be absent). Such an embodiment, which is but one of many, can be advantageous, for example, in connection with tanks made of plastic, aluminum, fiberglass or another non-ferrous material but can also be used on ferrous metal tanks if desired. In at least one embodiment, sensor module 802 can include or be configured to couple with a base 804, such as a mount, housing or connector, for operably coupling sensor module 802 in sensing communication with tank 10. For example, as shown in FIG. 23 for illustrative purposes, base 804 can be or include a ring having a side 806 configured to be coupled to tank 10 (e.g., mechanically, via an adhesive, or otherwise) and configured to couple with sensor module 802 for holding module 802 in an operative position relative to tank 10. Sensor module 802 can be configured to be threadably or otherwise directly coupled to base 804 or, as another example, sensor module 802 can include or be configured to couple with a coupler 808, such as a threaded nut or other coupling structure configured to couple with sensor module 802 and/or base 804, for coupling sensor module 802 to base 804, such as after base 804 is coupled to tank 10 (or otherwise). As shown in FIG. 23 for illustrative purposes, sensor module 802 can be at least generally circular or round but this need not be the case and sensor module 802 can be any shape(s) required or desired for an implementation of the disclosure. In at least one embodiment, sensor arrangement 800 can include one or more biasing devices (not shown in FIG. 23) for biasing sensor module 802 or a portion thereof into or toward sensing engagement with tank 10, such as one or more springs or, as another example, one or more seals, splines, spokes or fingers configured to elastically or plastically deform upon sensor module 802 and/or coupler 808 (if present) being coupled to base 804. Sensor arrangement 800 can optionally include structure for guiding or aligning one or more components of the system relative to one another. For example, in at least one embodiment, sensor module 802 and base 804 can have mating alignment features, such as one or more tongues 810 configured to mate with one or more grooves 812 for positioning sensor module 802 and base 804 relative to one another (e.g., rotationally, longitudinally or otherwise). One or more tongues 810 and grooves 812 can be disposed on either or both of sensor module 802 and base 804, and in any number. As another example, one or more tongues 810 and grooves 812 can be configured to keep sensor module 802 and base 804 in a proper operational position to one another as coupler 808 (if present) is threadingly or otherwise coupled to sensor module 802 and/or base 804.

In at least one embodiment, base 804 and coupler 808 can be configured to couple with one another via a snap fit configuration for holding a sensor module (e.g., sensor module 802, whether with or without one or more magnets) in sensing communication with tank 10 (see FIGS. 30-32 & 33-35). Base 804 and coupler 808 can have one or more snap fit couplers 812 configured to removably or otherwise couple with one another (e.g., a tab and corresponding ramp and/or slot, or other mating couplers for snap fit coupling) and coupler 808 can be configured to hold sensor module 802 at least partially within base 804 for disposing couplant 144 against or otherwise in sensing communication with tank 10. In at least one embodiment, coupler 808 can include one or more biasing devices 814 for biasing sensor module 802 toward tank 10. For instance, as shown in, e.g., FIGS. 30 and 35, one or more biasing devices 814 can be or include one or more fingers or extensions for pressing against the exterior of sensor module 802 and biasing sensor module 802 towards or into a position of sensing contact or communication with a tank, which can but need not include elastic or plastic deformation of one or more biasing devices 814, such as upon coupler 808 being coupled to base 804. In at least one embodiment, side 806 of base 804 can be configured for coupling with a tank 10 having a rounded or curved bottom (or other exterior surface), which can include being at least partially curved, angled or otherwise shaped for supporting coupling of sensor assembly 800 to tank 10 as illustrated in FIGS. 30-32. In at least one embodiment, side 806 of base 804 can be configured for coupling with a tank 10 having an at least partially or substantially flat bottom (or other exterior surface), which can include being at least partially or substantially flat for supporting coupling of sensor assembly 800 to tank 10 as illustrated in FIGS. 33-35. In either embodiment, and/or in other embodiments, sensor arrangement 800 can include one or more strips 816 for supporting operative coupling of sensor module 802 to a tank 10. For instance, one or more strips 816 can be or include an adhesive strip for adhering base 804 to tank 10 or, as other examples, a gasket, seal, buffer or other interim media for coupling base 804 and/or sensor module 802 to tank 10 or otherwise supporting sensing operations, such as by way of at least partially preventing ingress of contaminants or egress of grease, gel or another acoustic coupling material (if present) from an area between sensor module 802 and the exterior surface of a tank 10.

With continuing reference to the Figures and particular reference to FIGS. 27-29, in at least one embodiment, a sensor system or sensor arrangement 900 can include one or more sensor modules (e.g., sensor module 802) and a mount or mounting assembly 902 for operably coupling sensor module 802 in sensing communication with tank 10. For example, as shown in FIGS. 27-29 for illustrative purposes, mount 902 can be or include a ring 904 for coupling with foot ring 26 of a tank 10 (e.g., similarly to one or more of feet 118 described above (see, e.g., FIGS. 1, 13)) and configured to couple with sensor module 802 for holding module 802 in an operative position relative to tank 10. In at least one embodiment, ring 904 can include one or more supports 906, such as beams, arms or a web, for supporting a carrier 908, such as a frame or housing, configured to hold one or more sensor modules 802 in sensing communication with tank 10. Ring 904 can but need not include one or more openings 910 therein or there through, which can allow water (e.g., rainwater) to flow out of ring 904 for helping prevent corrosion of tank 10 or, as another example, which can be configured for allowing one or more fasteners (e.g., screws) or other couplers to pass there through for coupling ring 904 and tank 10 to one another.

In at least one embodiment, carrier 908 can be or include a cup or cup-like structure and sensor module 802 can be disposed at least partially therein or otherwise coupled thereto. In such an embodiment, which is but one of many, ring 904 and carrier 908 can be shaped and arranged for disposing sensor module 802 in sensing communication with tank 10 via the position or positioning of carrier 908 alone or, for instance, under the weight of tank 10 (e.g., in an implementation wherein tank 10 sits upright above ring 904). Alternatively, or collectively, mount 902 can be adapted for biasing sensor module 802 toward or into sensing communication with tank 10. For example, in at least one embodiment, one or more supports 906 can be configured for biasing sensor module 802 against the exterior surface of tank 10, such as by elastically or otherwise deforming upon the coupling of tank 10 and ring 904. As another example, in at least one embodiment, sensor arrangement 900 can include a biasing assembly 911 configured to couple with carrier 908 and/or sensor module 802 for biasing sensor module 802 against the exterior surface of tank 10. For instance, biasing assembly 911 can include one or more spring guides 912, such as a frame or housing, for coupling one or more springs 914 to carrier 908 and translating toward and/or away from tank 10 to push (or pull) sensor module 802 against tank 10 for sensing operations. Spring guide 912 can include one or more couplers 916, such as tabs or latches, for coupling with one or more corresponding couplers 918, such as slots or openings, on carrier 908 (or vice versa). Couplers 916, 918 can allow spring guide 912 to move axially under or against the force of spring 914 for adjustably positioning sensor module 802 relative to tank 10 while at least partially limiting rotational movement of one or more system components (e.g., spring guide 912 and one or more components coupled therewith) and retaining spring 914 at least partially between or otherwise in operative position with respect to spring guide 912 and carrier 908.

As shown for illustrative purposes in FIGS. 28-29, in at least one embodiment, spring 914 can be or include a wave spring, such as a stainless steel or other wave spring. However, this need not be the case, and alternatively (or collectively), spring 914 can be or include one or more other types of springs (e.g., coil springs, leaf springs, etc.). Further, spring 914 can be a single spring disposed about spring guide 912 but need not be and, in at least one embodiment, can include two or more springs disposed about spring guide 912, whether spring guide 912 be disposed at least partially within spring 914 or, as another example, whether one or more springs 914 be spaced radially about spring guide 912 such as between spring guide 912 and an interior of carrier 908. In at least one embodiment, biasing assembly 911 can include one or more trays 920 configured to couple with carrier 908 and/or sensor module 802. For example, tray 920 can have an opening 922, such as a central opening, for receiving at least a portion of a sensor module 802 therein, which can include being adapted to couple with sensor module 802 via snap fit, interference fit, the use of one or more fasteners or otherwise. Tray 920 can be configured to couple with spring guide 912 (e.g., via one or more snap fit couplers) for holding sensor module 802 relative thereto and for supporting proper alignment and positioning of sensor module 802 for sensing communication with tank 10, such as when ring 904 and foot ring 26 are coupled with one another. In at least one embodiment, ring 904 can be configured for coupling with a tank tray or other tank holder on a recreational vehicle or elsewhere (not shown) for securing a tank 10 coupled to ring 904 thereto, which can but need not include the use of one or more fasteners such as screws, bolts, tie-downs or the like (not shown) coupled to one or more of openings 910 or supports 906.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to fully protect all such modifications and improvements that come within the scope or range of equivalent of the following claims.

What is claimed is:

1. A sensor arrangement for measuring liquid height in a tank, comprising:
   a housing having an interior and an aperture, wherein the aperture is disposed through a wall of the housing;
   a transducer disposed in sensing communication with the aperture; and
   a couplant supporting the transducer, wherein the couplant includes a first portion comprising a compressible couplant body extending between the transducer and an external environment to transmit an acoustic pulse from the transducer to a tank bottom for measuring a height of a liquid disposed above the transducer.

2. The sensor arrangement of claim 1, wherein the couplant body extends from the transducer to a location in the external environment beyond an external surface of the housing.

3. The sensor arrangement of claim 1, wherein an external surface of the couplant body opposite the transducer is tacky.

4. The sensor arrangement of claim 1, wherein the couplant body includes a material with hardness that is between 20 Shore OO and 40 Shore OO.

5. The sensor arrangement of claim 1, wherein the housing defines a magnet seat offset from the aperture, and further comprising a magnet captive in the magnet seat.

6. The sensor arrangement of claim 5, wherein the magnet has an attractive force that exceeds a compressive strength of the couplant body.

7. The sensor arrangement as recited in claim 1, further comprising a controller disposed within the housing and operatively connected to the transducer.

8. The sensor arrangement as recited in claim 7, further comprising one of more leads disposed within the aperture and connecting the transducer with the controller.

9. The sensor arrangement as recited in claim 7, further comprising a coin cell battery disposed within the housing interior and connected to the controller.

10. The sensor arrangement as recited in claim 7, further comprising a wireless module disposed within the housing and operatively connected to the controller for communication with an external display module.

11. The sensor arrangement as recited in claim 7, further comprising a display module remote from the housing and in wireless communication with the controller.

12. The sensor arrangement as recited in claim 7, wherein the controller is in communication with a non-transitory machine-readable memory with instructions recorded thereon that cause the controller to:
  generate an acoustic pulse with the transducer;
  receive a reflected acoustic pulse with the transducer; and
  provide an advertisement packet to a display module wirelessly connected to the controller indicative of a time interval between generation of the acoustic pulse and receipt of the reflected acoustic pulse.

13. The sensor arrangement as recited in claim 1, further comprising at least one elastomeric foot with a slot, the slot being configured to receive a foot ring of a liquefied propane gas (LPG) tank.

14. A sensor system, comprising:
  a sensor arrangement as recited in claim 1;
  a controller disposed within the housing and operatively connected to the transducer;
  a wireless module disposed within the housing and connected to the controller for communication with an external display module; and
  a display module remote from the housing and in wireless communication with the controller, wherein the controller is in communication with a non-transitory machine-readable memory with instructions recorded thereon that cause the controller to:
  generate an acoustic pulse with the transducer;
  receive a reflected acoustic pulse with the transducer; and
  provide an advertisement packet to a display module indicative of a time interval between generation of the acoustic pulse and receipt of the reflected acoustic pulse.

15. The sensor arrangement as recited in claim 1, wherein the couplant further comprises a second portion configured to hold the transducer against the first portion, and wherein the first portion and the second portion are sealingly coupled to one another within the interior of the housing.

16. The sensor arrangement as recited in claim 1, wherein the couplant further comprises at least one opening through at least a portion thereof for routing therethrough at least one wire coupled to the transducer, wherein the at least one opening is disposed within the interior of the housing, and wherein at least a portion of the couplant is sealingly coupled to an interior surface of the housing.

* * * * *